United States Patent
Skapof et al.

(10) Patent No.: US 12,115,925 B2
(45) Date of Patent: Oct. 15, 2024

(54) MOLDED PANEL AND MANUFACTURE THEREOF

(71) Applicant: Rivian IP Holdings, LLC, Plymouth, MI (US)

(72) Inventors: Robert Skapof, Coto De Caza, CA (US); Adam Thomas Woodward, San Clemente, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/183,195

(22) Filed: Mar. 14, 2023

(65) Prior Publication Data

US 2024/0217469 A1  Jul. 4, 2024

Related U.S. Application Data

(60) Provisional application No. 63/477,703, filed on Dec. 29, 2022.

(51) Int. Cl.
| | |
|---|---|
| B60R 21/205 | (2011.01) |
| B29C 45/00 | (2006.01) |
| B29C 45/14 | (2006.01) |
| B60R 21/2165 | (2011.01) |
| B29L 31/30 | (2006.01) |

(52) U.S. Cl.
CPC ........ *B60R 21/205* (2013.01); *B29C 45/0081* (2013.01); *B29C 45/14* (2013.01); *B60R 21/2165* (2013.01); *B29L 2031/3038* (2013.01)

(58) Field of Classification Search
CPC .............. B60R 21/205; B60R 21/2165; B69L 2031/3038
See application file for complete search history.

(56) References Cited

U.S. PATENT DOCUMENTS

| | | | |
|---|---|---|---|
| 7,357,410 B2* | 4/2008 | Soejima | B29C 59/007 280/728.3 |
| 8,336,908 B1* | 12/2012 | Kalisz | B60R 21/205 280/728.3 |
| 10,377,336 B2* | 8/2019 | Lu | B60R 21/2171 |
| 10,752,197 B2* | 8/2020 | Patnala | B60R 21/205 |
| 11,332,095 B2* | 5/2022 | Harris | B32B 3/266 |

FOREIGN PATENT DOCUMENTS

JP 2004175305 A * 6/2004 ......... B29C 65/0618

* cited by examiner

*Primary Examiner* — Faye M Fleming
(74) *Attorney, Agent, or Firm* — Foley & Lardner LLP

(57) ABSTRACT

An apparatus is disclosed. The apparatus can be a dashboard member. The dashboard member can include a panel member. The panel member can include a weakening portion integrally molded with the panel member to create a tear seam. The dashboard member can include a chute member integrally molded with the panel member. The chute member can support an air bag and direct the air bag through the tear seam.

17 Claims, 15 Drawing Sheets

MOLDED PANEL AND MANUFACTURE THEREOF

CROSS REFERENCE TO RELATED PATENT APPLICATION

This application claims the benefit of and priority to U.S. Provisional Patent Application No. 63/477,703, filed Dec. 29, 2022, which is incorporated herein by reference in its entirety.

INTRODUCTION

A vehicle can include dashboards, instrument panels, or other components.

SUMMARY

A dashboard member of a vehicle can include a panel member integrally molded with a chute member in a single molding process, rather than separately molding the panel member and the chute member and subsequently joining the two together in a separate operation. The chute member can include at least one wall to define a cavity and to support an airbag within the cavity. The dashboard member can include the panel member including an airbag cover. The panel member can include a weakening portion integrally molded with the airbag cover to form a tear seam. The panel member can include at least one weakening portion to form a bending seam. The chute member can support an airbag to direct the airbag through the tear seam. The chute member can be integrally molded with the panel member at a joint. A chemical foaming agent can be provided (e.g., injected) into a mold to create (e.g., produce) one or more voids within the joint during a molding operation to prevent sink defects. The dashboard member can include a hinge coupled with the airbag cover. For example, the hinge can be an over-molded hinge that can be at least partially impregnated with polymeric material during a molding operation to mold the dashboard member. The dashboard member can include the panel member molded behind a topcoat. The dashboard member can include the weakening portion to create the tear seam or the bending seam with the dashboard member molded with a constant pressure molding system to facilitate molding of thin sections.

At least one aspect is directed to an apparatus. The apparatus can be a dashboard member. The dashboard member can include a panel member. The panel member can include a weakening portion integrally molded with the panel member to create a tear seam. The dashboard member can include a chute member integrally molded with the panel member. The chute member can support an air bag and direct the air bag through the tear seam.

At least one aspect is directed to a method. The method can be a method of manufacturing a dashboard member. The method can include integrally molding, by a molding system during a single molding operation, a panel member with a chute member at a joint. The panel member can include a weakening portion integrally molded with the panel member to form a tear seam. The chute member can support an airbag and direct the airbag through the tear seam. The joint can include a porous polymeric material.

At least one aspect is directed to a vehicle. The vehicle can include a dashboard member within an interior of the vehicle. The dashboard member can include a panel member. The panel member can include a weakening portion integrally molded with the panel member to create a tear seam. The dashboard member can include a chute member integrally molded with the panel member at a joint. The chute member can support an air bag and direct the air bag through the tear seam. The joint can include a porous polymeric material.

At least one aspect is directed to a method. The method can be a method of providing a dashboard member. The dashboard member can include a panel member. The panel member can include a weakening portion integrally molded with the panel member to create a tear seam. The dashboard member can include a chute member integrally molded with the panel member. The chute member can support an air bag and direct the air bag through the tear seam.

At least one aspect is directed to a method. The method can be a method of providing a system. The system can be a molding system including an injection molding system and a mold. The system can mold a dashboard member. The dashboard member can include a panel member. The panel member can include a weakening portion integrally molded with the panel member to create a tear seam. The dashboard member can include a chute member integrally molded with the panel member. The chute member can support an air bag and direct the air bag through the tear seam.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
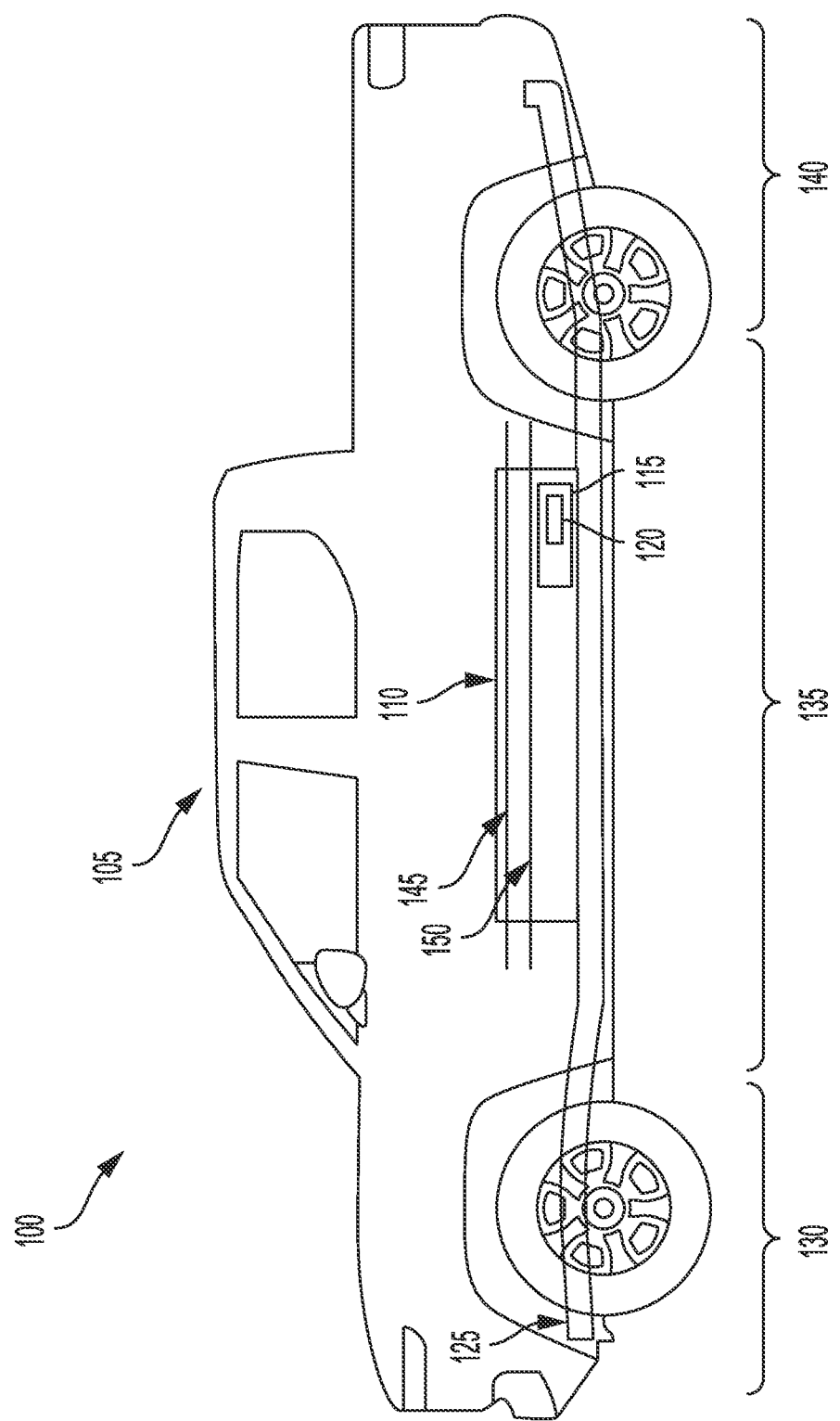
FIG. 1 depicts an example electric vehicle, in accordance with some aspects.

Following below are more detailed descriptions of various concepts related to, and implementations of, methods, apparatuses, and systems of molded panels, such as molded dashboard panels for automobiles. The various concepts introduced above and discussed in greater detail below may be implemented in any of numerous ways.

The present disclosure is directed to systems and methods of molded panels, such as molded panels for automobiles, such as dashboard members, instrument panels, headliners, overhead panels, hard trims, door panels, or some other panel or planar member. For example, the present disclosure is directed to a dashboard member including a panel member integrally molded with a chute member and methods or systems for molding the same. The dashboard member can include the panel member integrally molded with the chute member in a single molding process, rather than separately molding the panel member and the chute member and subsequently joining the two together in a separate operation. The chute member can include at least one wall to define a cavity and to support an airbag within the cavity. The dashboard member can include the panel member including an airbag cover. The panel member can include a weakening portion integrally molded with the airbag cover to form a tear seam. The panel member can include at least one weakening portion to form a bending seam. The chute member can support an airbag to direct the airbag through the tear seam. For example, the airbag can expand or inflate when actuated. The airbag can impart a force on the airbag cover with the airbag expanding, and the force can break the airbag cover along the tear seam and cause one or more portions of the airbag cover to bend at the bending scam.

The dashboard member can include the chute member integrally molded with the panel member at a joint. The joint can be a junction between the chute member and the panel member. The joint can include a porous polymeric material. For example, the joint can include a porous material formed by a chemical foaming agent. A chemical foaming agent can be provided (e.g., injected) into a mold to create (e.g., produce) one or more voids within the joint during a molding operation. The gas can cause a polymeric material to expand at the joint or other regions of the dashboard member to prevent sink defects. The dashboard member can include a hinge coupled with the airbag cover. For example, the hinge can be an over-molded hinge that can be at least partially impregnated with polymeric material during a molding operation to mold the dashboard member. The hinge can be coupled with a portion of the airbag cover to retain the portion of the airbag cover with a remainder of the dashboard member with the tear seam broken (e.g., with the airbag deployed). The dashboard member can include a topcoat. The topcoat can form an outer surface of the dashboard member. The topcoat can be applied to, coupled with, or positioned on an outer surface of the panel member. The panel member can be molded with the topcoat positioned within the mold. For example, the panel member can be molded against the topcoat, and the topcoat can become at least partially impregnated with a polymeric material as the panel member is molded. The dashboard member can be molded by a molding system (e.g., an injection molding system), where the molding system can continuously vary an injection velocity in order to maintain a constant injection pressure.

The disclosed solutions have a technical advantage of providing a single, integrally-molded dashboard member rather than a dashboard member produced via a series of steps. For example, the dashboard member can include one or more of the panel member integrally molded with chute member, the weakening portion integrally molded with the panel member to form a tear seam, a weakening portion integrally molded with the panel member to form a bending seam, a hinge integrally molded with the panel member, or a topcoat molded with the panel member in a single processing step. The dashboard member can include the chute member integrally molded with the panel member at a joint having a porous polymeric material to reduce or prevent sink-related defects that can result when molding a chute member with a panel member (e.g., molding members having differing cross-sectional thicknesses). The dashboard member can include the weakening portion to create the tear seam or the bending seam with the dashboard member molded with a constant pressure molding system to facilitate molding of thin sections.

FIG. 1 depicts an example cross-sectional view 100 of a vehicle. The vehicle can be an electric vehicle or some other vehicle (e.g., a gasoline-powered vehicle, a solar-powered vehicle, or a vehicle powered by some other energy source or motive element). For example, the vehicle can be an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, batteries 115 or battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery 115, the battery modules 115, or the battery cells 120 with other electrical components of the electric vehicle 105 to provide electrical power to various systems or components of the electric vehicle 105.

Figure 2:
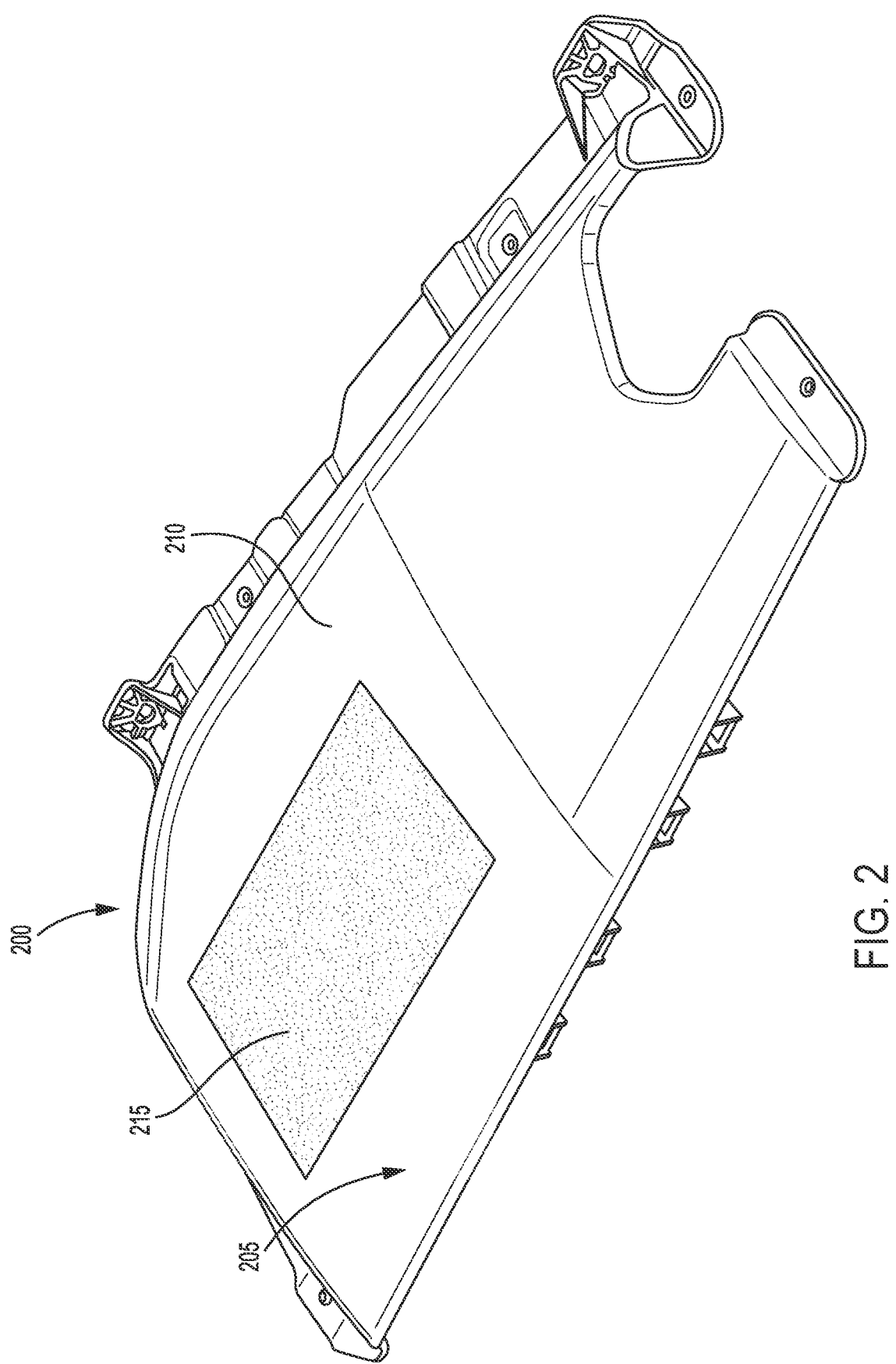
FIG. 2 depicts an example dashboard member, in accordance with some aspects.

FIGS. 2-6, among others, depict an apparatus 200. The apparatus 200 can be a dashboard member 200. The dashboard member 200 can be or include a portion of a dashboard for a vehicle, such as the electric vehicle 105. The dashboard member 200 can be a member for installation in some other device, apparatus, or system. As depicted in FIG. 2, among others, the dashboard member 200 can include at least one panel member 205 and a surface 210. The panel member 205 can be or include a portion of the surface 210 of the dashboard member 200. For example, the panel member 205 can be an area, region, portion, or zone of the dashboard member 200. The panel member 205 can include an airbag cover 215. For example, the airbag cover 215 can be a portion of the panel member 205 that can be opened by an airbag during deployment of the airbag to allow the airbag to expand into an interior of a vehicle (e.g., towards a passenger or between a passenger and a portion of the vehicle such as a dashboard). The airbag cover 215 can cover an opening or cavity containing an airbag. The airbag cover 215 can be a door that can selectively open (e.g., during deployment of an airbag) to allow an airbag to be deployed through the panel member 205.

As depicted in FIGS. 3-6, among others, the dashboard member 200 can include at least one chute member 310 joined with and extending from a surface 300 of the dashboard member 200. For example, the dashboard member 200 can include the panel member 205 having the surface 210 opposite the surface 300. The surface 300 can be an inner surface and the surface 210 can be an outer surface. For example, the surface 210 can be visible or outward-facing with the dashboard member 200 installed (e.g., in an electric vehicle 105), while the surface 300 is invisible to a user when the dashboard member is installed. The chute member 310 can be coupled with the dashboard member 200 and can extend from the surface 300 of the dashboard member 200. For example, the chute member 310 can extend inwardly (e.g., away from the surface 210). The chute member 310 can support an airbag. For example, the chute member 310 can support an airbag and direct the airbag through the airbag cover 215 of the panel member 205.

The chute member 310 can include at least one wall 315. The chute member 310 can include define a cavity 320. For example, the chute member 310 can include the wall 315 or multiple walls 315 to define the cavity 320. The chute member 310 can include the multiple walls 315 coupled together or otherwise connected to each other. The chute member 310 can include a single wall 315 to bound, encircle, or otherwise define the cavity 320. The chute member 310 can include multiple walls 315 that are continuous (e.g., connected, integrally formed, coupled) or discontinuous (e.g., discrete, separate, singular). The wall 315 can extend from the surface 300 of the panel member 205. For example, the wall 315 can extend perpendicularly or substantially perpendicularly (e.g., ±30 degrees from perpendicular) from the wall 315 to define the cavity 320. The wall 315 or multiple walls 315 can define the cavity 320 having a rectangular cross-sectional shape (e.g., a rectangular with rounded corners), a circular cross-sectional shape, an ovular cross-sectional shape, or some other cross-sectional shape.

The dashboard member 200 can include the chute member 310 integrally molded with the panel member 205. For example, the panel member 205 and the chute member 310 can be molded together in a single molding operation or be molded within the same mold at the same time. The chute member 310 can be integrally molded with the panel member 205 because the chute member 310 and the panel member 205 can be molded in the same mold to create a single, unitary part. For example, rather than the chute member 310 being molded separately from the panel member 205 and then subsequently joined with the panel member 205 in a different operation, the chute member 310 and the panel member 205 can be integrally molded in a single molding operation. The panel member 205 and the chute member 310 can be or include a polymeric material. For example, the dashboard member 200 can include a plastic material (e.g., synthetic polymeric material, non-synthetic polymeric material, organic polymeric material, inorganic polymeric material, some other material, or some combination thereof) molded within a mold to form the panel member 205 and the chute member 310. The panel member 205 and the chute member 310 can be integrally molded during a single injection molding operation where both the panel member 205 and the chute member 310 are molded from molten polymeric material and where the panel member 205 and the chute member 310 are integrally joined together. For example, the dashboard member 200 can be molded within in a mold such that a molding operation to produce the dashboard member 200 produces both the panel member 205 and the chute member 310 formed as a unitary structure. Rather than molding the panel member 205 in a first operation and separately molding the chute member 310 in a separate second operation, and then joining the panel member 205 with the chute member 310 in a third operation, the dashboard member 200 can include the panel member 205 integrally molded with the chute member 310 in a single operation.

The dashboard member 200 can include the chute member 310 integrally molded with the panel member 205 at a joint 330. For example, the chute member 310 can be integrally molded with the panel member 205 and extend from the surface 300 of the panel member 205. The joint 330 can be an area, region, portion, or zone at which the chute member 310 and the panel member 205 are joined, combined, or integrally formed. For example, the joint 330 can be a region in which the dashboard member 200 transitions from the panel member 205 to the chute member 310. The joint 330 can be the junction at which the chute member 310 extends from the surface 300 of the panel member 205. For example, the joint 330 can be the junction at which the chute member 310 extends perpendicularly or substantially perpendicularly (e.g., ±30° from perpendicular) to the surface 300 of the panel member 205. The joint 330 can be a region of the integrally molded panel member 205 and chute member 310, rather than a separately formed component. For example, the joint 330 can be created by the integral molding of the panel member 205 with the chute member 310.

The dashboard member 200 can include the chute member 310 having integrally molded with the panel member 205 at the joint 330, with the joint 330 including a porous polymeric material. For example, the joint 330 of can include a polymeric material having at least one pore, void, opening, or space formed therein. The porous polymeric material can include bubbles of air or some other gas entrapped within a polymeric material. For example, the joint 330 can include the polymeric material having multiple pores, voids, openings, or spaces formed by air or gas entrapped within the polymeric material. The joint 330 can include pores comprising less than 10-25%, 25-50%, 50-75%, or greater than 75% porosity by volume. The joint 330 can include the porous polymeric material that differs from a polymeric material of other portions, regions, or areas of the dashboard member 200. For example, the dashboard member 200 can include portions, regions, or areas of solid or non-porous polymeric material. The dashboard member 200 can include porous polymeric material at the joint 330 and non-porous polymeric material elsewhere. The dashboard member 200 can include the porous polymeric material at the joint 330 and in other portions, regions, or areas of the dashboard member 200 (e.g., the panel member 205).

The dashboard member 200 can include the chute member 310 integrally molded with the panel member 205 at the joint 330 with the chute member 310 (e.g., the wall 315 of the chute member 310) having a first wall thickness 650 that is greater than a second wall thickness 655 of the panel member 205. The first wall thickness 650 of the chute member 310 can be greater than the second wall thickness 655 of the panel member 205. For example, the first wall thickness 650 of the chute member 310 can be 1.5 times, 1.5-2 times, 2-3 times, or more than 3 times greater than the second wall thickness 655 of the panel member 205. A sink defect can be or include a depression, indent, crater, cavity, dimple, groove, or other shrinkage that can be visibly detected from a surface (e.g., the surface 210) of a molded polymeric component. Sink defects can result from uneven cooling or uneven contraction of a molded component as it cools. Uneven cooling or uneven contraction of molten polymeric material can occur in molded components having relatively thin-walled areas joined with relatively thick-walled areas such that sink defects can occur at or near a joint or intersection of a relatively thin-walled area and a relatively thick-walled area. For example, a sink defect can occur at the intersection of the panel member 205 and the chute member 310 because the chute member 310 can have the first wall thickness 650 that can be greater than the second wall thickness 655 of the panel member.

The dashboard member 200 can include the joint 330 including a porous polymeric material to reduce or substantially prevent (e.g., prevent±95% of) sink defects. For example, because the chute member 310 can include the first wall thickness that is greater than the second wall thickness of the panel member 205, the joint 330 can be susceptible to sink defects or other defects that can result from the difference between the first wall thickness and the second wall thickness. A high chute member-to-panel member wall thickness ratio can render the joint 330 susceptible to sink defects that can be visible from the surface 210 of the dashboard member 200, for example. The joint 330 can include the porous polymeric material to prevent the joint 330 from exhibiting a sink defect because the air or gas entrapped in the polymeric material can cause the joint 330 to expand (e.g., increase in volume). The expansion of the joint 330 can counteract, reduce, or prevent a sink defect from occurring. The joint 330 or other portions of the panel member 205 can include the porous polymeric material, a nonporous polymeric material, some other material (e.g., a nonpolymeric material), or some combination thereof. For example, a portion of the joint 330 (e.g., less than the entire joint) can include the porous polymeric material, while another portion of the joint 330 can include a nonporous (e.g., solid) polymeric material.

For example, the dashboard member 200 can include the chute member 310 integrally molded with the panel member 205 at the joint 330 where the joint 330 includes a porous polymeric material formed by a chemical foaming agent. The chemical foaming agent can be mixed or blended with a polymeric material and provided (e.g., injected) into a mold to mold the panel member 205 and the chute member 310. The chemical foaming agent can be an organic or inorganic chemical compound that can undergo a chemical reaction or chemical decomposition with the polymeric material and chemical foaming agent provided (e.g., injected) into a mold. For example, the chemical foaming agent can undergo a gas evolution reaction with the chemical foaming agent within the mold to create a gas. The chemical foaming agent can undergo an endothermic reaction or an exothermic reaction. The chemical foaming agent can produce (e.g., release) carbon dioxide, nitrogen, or some other gas during a chemical reaction within the mold. The released gas can cause the polymeric material within the mold to expand, which can counteract the contraction or shrinkage associated with uneven cooling or high wall thickness ratios, and thereby prevent sink defects. The chemical foaming agent can be 1.8-2% by volume of a material used to mold the dashboard member 200. For example, the chemical foaming agent can be one or more portions of a polymeric material or mixture of polymeric materials used to mold the dashboard member 200 (e.g., via injection molding or some other molding process. The chemical foaming agent can be less than 1.8% by volume of a material used to mold the dashboard member 200. The chemical foaming agent can be more than 2% by volume of a material used to mold the dashboard member 200.

The dashboard member 200 can include the chute member 310 having a first wall 315 and a second wall 315. For example, the dashboard member 200 can include the first wall 315 of the chute member 310 integrally molded with the panel member 205 at a first joint 330 and a second wall 315 of the chute member 310 integrally molded with the panel member 205 at a second joint 330. The first wall 315 of the chute member 310 can be integrally formed with the second wall 315 of the chute member 310 such that the first wall 315 and the second wall 315 form a single unitary wall 315 of the chute member 310. The first wall 315 can be a portion of a single unitary wall 315 and the second wall 315 can be a second portion of the single unitary wall 315. For example, the first wall 315 can be a portion of the wall 315 on one side of the chute member 310 (e.g., one side of the cavity 320), and the second wall 315 can be a portion of the wall 315 on an opposite or different side of the chute member 310 (e.g., an opposite or different side of the cavity 320). The first wall 315 can be integrally molded with the panel member 205 at the first joint 330 and the second wall 315 can be integrally molded with the panel member 205 the second joint 330 with the first wall 315 and the second wall 315 integrally formed. For example, the joint 330 can extend around an entire perimeter of a single unitary wall 315, such that the first joint 330 can be a first portion of the joint 330 on one side of the chute member 310 (e.g., on one side of the cavity 320) and the second joint 330 can be a second portion of the joint 330 on an opposite or different side of the chute member 310 (e.g., on an opposite or different side of the cavity 320).

The chute member 310 can include the wall 315 supported by at least one gusset 325. For example, the gusset 325 can be a member extending perpendicularly or substantially perpendicularly (e.g., ±30 degrees from perpendicular) from the wall 315 and perpendicularly or substantially perpendicularly (e.g., ±30 degrees from perpendicular) from the surface 300 of the panel member 205. The gusset 325 can be a thin, fin-shaped member to support the wall 315 or to prevent the wall 315 from bending or flexing relative to the dashboard member 200. The gusset 325 can support the wall 315 and the panel member 205 to prevent the chute member 310 (e.g., the wall 315 of the chute member 310) from separating from the panel member 205. The chute member 310 can be supported by multiple gussets 325. For example, multiple gussets 325 can be positioned around a perimeter of the cavity 320 defined by one or more walls 315.

The dashboard member 200 can include the airbag cover 215 including a first portion 355 and a second portion 360. The first portion 355 and the second portion 360 of the airbag cover 215 can be separated by a tear seam 345. For example, the dashboard member 200 can include the panel member 205 including at least one tear seam 345. The tear seam 345 can be a seam (e.g., line, path, or joint) that can break, tear, or fracture when subject to a sufficient force (e.g., a force imparted by the deployment of an airbag). For example, the tear seam 345 can be a seam separating the first portion 355 of the panel member 205 from the second portion 360 of the panel member 205. For example, the airbag cover 215 can include the first portion 355 and the second portion 360 separated by the tear seam 345. The tear seam 345 can bisect, separate, or divide the airbag cover 215 into the first portion 355 and the second portion 360 of the panel member 205. For example, tear seam 345 can couple (e.g., connect) the first portion 355 with the second portion 360 with the tear seam 345 intact (e.g., unbroken, unseparated, or unfractured). The first portion 355 and the second portion 360 can be separated (e.g., decoupled or disconnected) with the tear seam 345 broken. The tear seam 345 can include a wall thickness that is thinner than a wall thickness of the airbag cover 215 such that a force imparted on the airbag cover 215 causes the tear seam 345 to break (e.g., fracture, separate) before another portion of the airbag cover 215 breaks. For example, the tear seam 345 can be a weakened seam of the airbag cover 215 such that the airbag cover 215 is structured to break along the tear seam 345. The tear seam 345 can extend across the airbag cover 215. For example, the tear seam 345 can extend from one end of the cavity 320 (e.g., from one wall 315 or from one portion of the wall 315) to another end of the cavity (e.g., an opposing or different wall 315 or from an opposing or different portion of the wall 315). The tear seam 345 can extend perpendicularly or substantially perpendicularly (e.g., ±30° from perpendicular) to a wall 315 of the chute member 310 or at some other angle relative to the wall 315.

The dashboard member 200 can include the panel member 205 including at least one bending seam 335. For example, the bending seam 335 can be a seam (e.g., a line, a path, joint) at which the panel member 205 or a portion thereof can bend, rotate, pivot, or flex. As depicted in FIGS. 3-6, among others, the dashboard member 200 can include the panel member 205 including a first bending seam 335 to facilitate the bending of a first portion 355 of the panel member 205 and a second bending seam 335 to facilitate the bending of a second portion 360 of the panel member 205. The panel member 205 can include one bending seam 335, two bending seams 335, three bending seams 335, four bending seams 335, or some other number of bending seams 335. The first bending seam 335 and the second bending seam 335 can be positioned within the cavity 320 defined by the chute member 310. For example, the first bending seam 335 and the second bending seam 335 positioned at or proximate (e.g., within five centimeters, within two centimeters, within one centimeter) of opposing walls 315 of the chute member 310. The first bending seam 335 can be parallel or substantially parallel (e.g., ±30° from parallel) with the second bending scam 335. The first bending seam 335 can be positioned along (e.g., parallel to, within five centimeters of) a first joint 330 and the second bending seam 335 can be positioned along (e.g., parallel to, within five centimeters of) a second joint 330. The first bending seam 335 can facilitate the opening of the airbag cover 215 with an airbag deployed through the airbag cover 215. For example, the first portion 355 of the airbag cover 215 can be coupled with the panel member 205 via the first bending seam 335 such that the first portion 355 can pivot (e.g., bend, flex, rotate) about the first bending seam 335. The first portion 355 can pivot about the first bending seam 335 with the tear seam 345 broken. For example, the first portion 355 can pivot about the first bending seam 335 such that the portion 355 is rotated past the first bending seam 335 to allow an airbag to be deployed. The first bending seam 335 can tear (e.g., rip, separate, break, shear). For example, the first bending seam 335 can partially or completely tear with the first portion 355 rotated about the bending seam 335 and with the tear seam 345 broken. The second portion 360 of the airbag cover 215 can be coupled with the panel member 205 via the second bending seam 335 such that the second portion 360 can pivot (e.g., bend, flex, rotate) about the second bending seam 335. The second portion 360 can pivot about the second bending seam 335 with the tear seam 345 broken. For example, the second portion 360 can pivot about the second bending seam 335 such that the portion 360 is rotated past the second bending seam 335 to allow an airbag to be deployed. The second bending seam 335 can tear (e.g., rip, separate, break, shear). For example, the second bending seam 335 can partially or completely tear with the second portion 360 rotated about the bending seam 335 and with the tear seam 345 broken.

Figure 3:
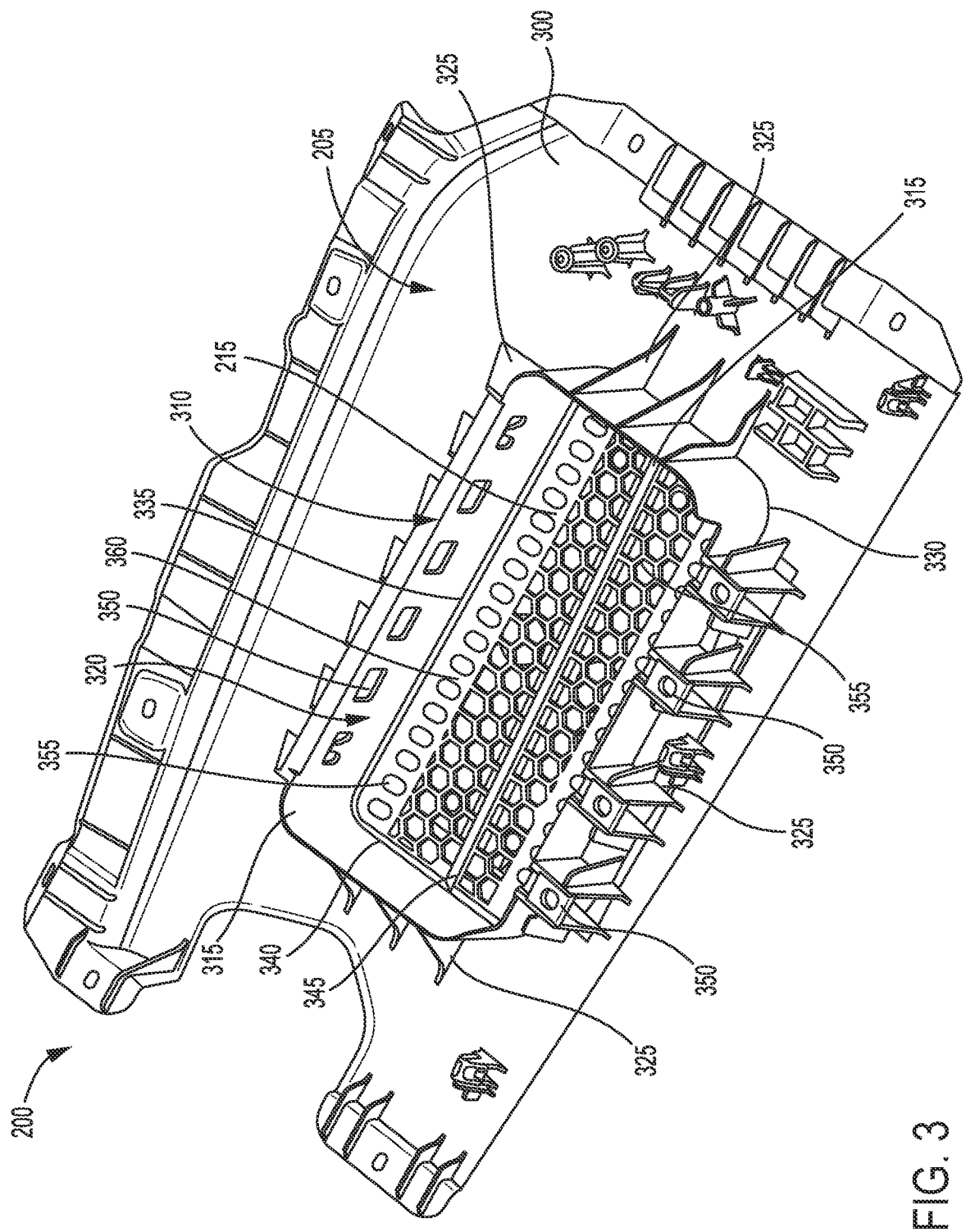
FIG. 3 depicts an example dashboard member, in accordance with some aspects.
Figure 4:
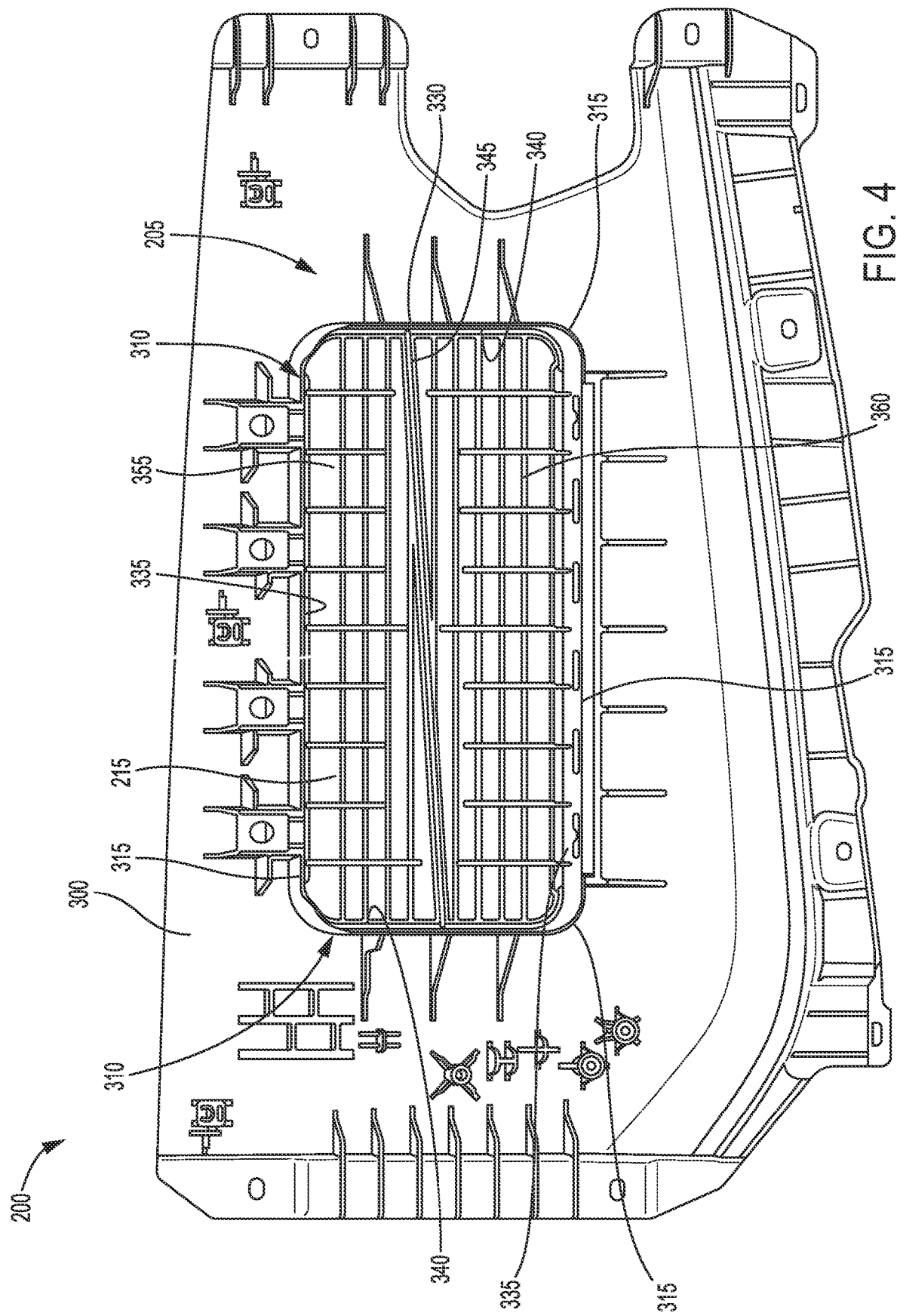
FIG. 4 depicts an example dashboard member, in accordance with some aspects.

The dashboard member 200 can include the panel member 205 including at least one breaking seam 340. The breaking seam 340 can be perpendicular or substantially perpendicular (e.g., ±30° from perpendicular) to the tear seam 345 or the bending seam 335. The breaking seam 340 can be a scam (e.g., line, path, or joint) that can break, tear, or fracture when subject to a sufficient force (e.g., a force imparted by the deployment of an airbag). For example, the breaking scam 340 can be a seam separating the airbag cover 215 of the panel member 205 from a remainder of the dashboard member 200 (e.g., from a remainder of the panel member 205, from the chute member 310, and from the joint 330). The dashboard member 200 can include the airbag cover 215 bounded by or separated from the remainder of the dashboard member 200 by the breaking seam 340 and the bending seam 335. For example, as depicted in FIGS. 3 and 4, among others, the breaking seam 340 and the bending seam 335 can form a boundary around the airbag cover 215. The breaking seam 340 can separate the first portion 355 of the airbag cover 215 and the second portion 360 of the airbag cover 215 from a remainder of the dashboard member 200. For example, the breaking seam 340 can couple (e.g., connect) at least one edge or segment of the first portion 355 and the second portion 360 with the dashboard member 200 with the breaking scam 340 intact (e.g., unbroken, unseparated, or unfractured). The first portion 355 and the second portion 360 can be at least partially separated (e.g., decoupled or disconnected) from the dashboard member 200 with the breaking seam 340 broken. For example, the first portion 355 and the second portion 360 of the airbag cover 215 can be coupled with the dashboard only at the bending seam 335 with the tear seam 345 and the breaking seam 340 broken.

The breaking seam 340 can include a wall thickness that is thinner than a wall thickness of the airbag cover 215 such that a force imparted on the airbag cover 215 will cause the breaking seam 340 to break (e.g., fracture, shear, separate) before another portion of the airbag cover 215 breaks. For example, the breaking seam 340 can be a weakened seam of the airbag cover 215 such that the airbag cover 215 is structured to break along the breaking seam 340. The breaking seam 340 can extend along an edge or a portion of an edge of the airbag cover 215. For example, the breaking seam 340 can extend along one end of the cavity 320 (e.g., from one wall 315 or from one portion of the wall 315). A second breaking seam 340 extend along an o another end of the cavity (e.g., an opposing or different wall 315 or from an opposing or different portion of the wall 315). The tear seam 345 can extend parallel or substantially parallel (e.g., ±30° from parallel) to a wall 315 of the chute member 310 or at some other angle relative to the wall 315.

The dashboard member 200 can include the first portion 355 and the second portion 360 of the airbag cover 215 bounded by the tear seam 345, the bending seam 335, and the breaking seam 340. For example, the first portion 355 can be bounded by the tear seam 345, the second bending scam 335, and two breaking seams 340. The second portion 360 can be bounded by the tear seam 345, the second bending seam 335, and the two breaking seams 340. During deployment of an airbag (e.g., the airbag 620 depicted in FIG. 6 and as described below), the airbag cover 215 can break along the tear seam 345, break along each of the breaking seams 340, and bend along each of the bending seams 335. For example, the airbag cover 215 can break along the tear seam 345, break along each of the breaking seams 340, and bend along each of the bending seams 335 with the first portion 355 of the airbag cover 215 pivoting (e.g., rotating, bending, flexing) about the first bending seam 335 and the second portion 360 of the airbag cover 215 pivoting (e.g., rotating, bending, flexing) about the second bending seam 335. The bending seams 335, the breaking seams 340, and the tear seam 345 can collectively form a generally H-shaped pattern to define the first portion 355 and the second portion 360 of the airbag cover 215. The first portion 355 and the second portion 360 of the airbag cover 215 separate with the tear seam 345 broken and respectively pivot at the first bending seam 335 and the second bending seam 335. An airbag can exit the cavity 320 of the chute member 310 with the tear seam 345 broken, with first portion 355 rotated about the first bending seam 335, and the second portion 360 rotated about the second bending seam 335. Although the first portion 355 and the second portion 360 are depicted as having rectangular or semi-rectangular form factors, the first portion 355 or the second portion 360 can include a different form factor (e.g., semi-circular). For example, the first portion 355 and the second portion 360 can include a form factor corresponding to or according to a cross-sectional shape of the cavity 320 as defined by the wall 315 of the chute member 310.

Figure 5:
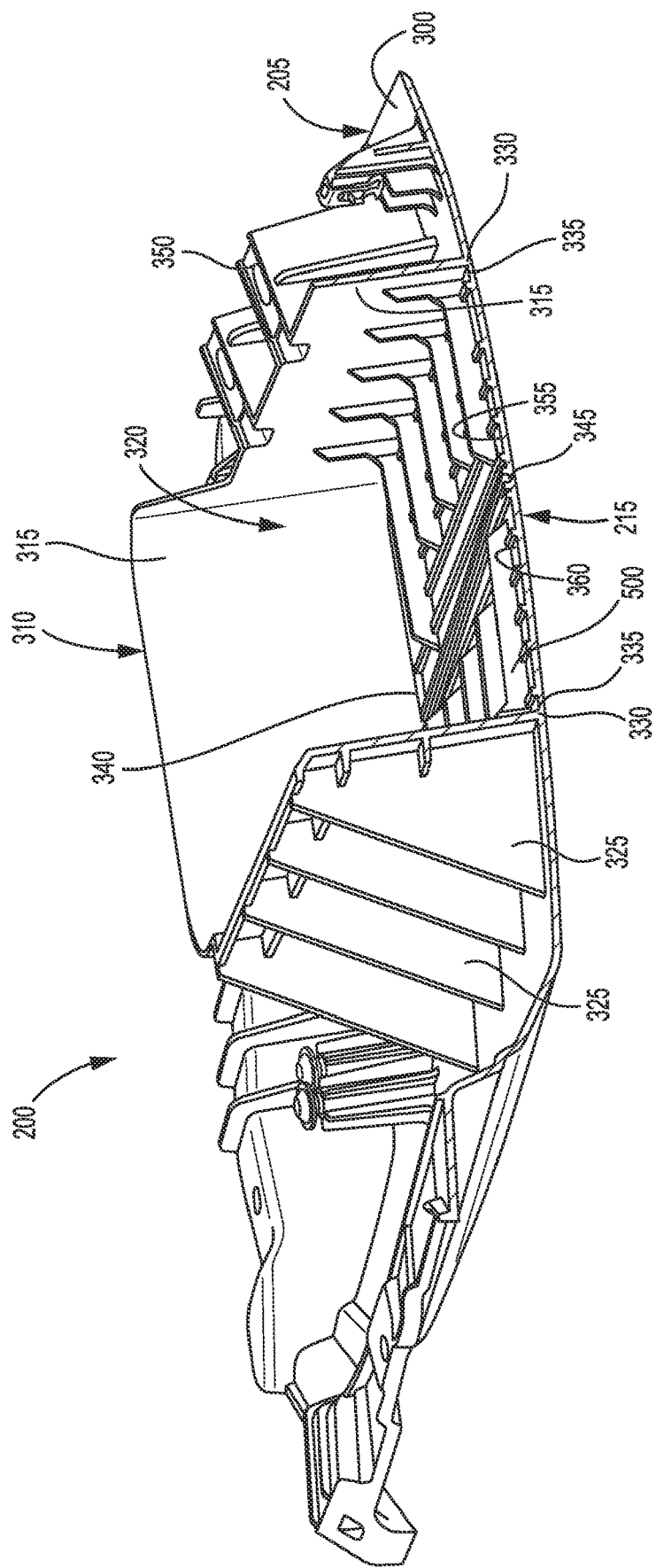
FIG. 5 depicts an example cross-sectional view of a dashboard member, in accordance with some aspects.

As depicted in FIG. 5, among others, a cross-sectional view of the dashboard member 200 is shown. The dashboard member 200 can include the airbag cover 215 of the panel member 205 including at least one support rib 500. For example, the support rib 500 can be a structural member extending from the surface 300 of the panel member 205 on the airbag cover 215. For example, the support rib 500 can extend inwardly from the airbag cover 215. The support rib 500 can bolster a rigidity of the airbag cover 215 to prevent the airbag cover 215 from bending, flexing, or breaking at a point other than the tear seam 345, the bending seam 335, or the breaking seam 340. For example, the first portion 355 of the airbag cover 215 can include the support rib 500 and the second portion 360 of the airbag cover 215 can include the support rib 500 such that neither the first portion 355 nor the second portion 360 of the airbag cover 215 can bend, flex, or break in an area other than the tear seam 345, the bending seam 335, or the breaking seam 340.

Figure 6:
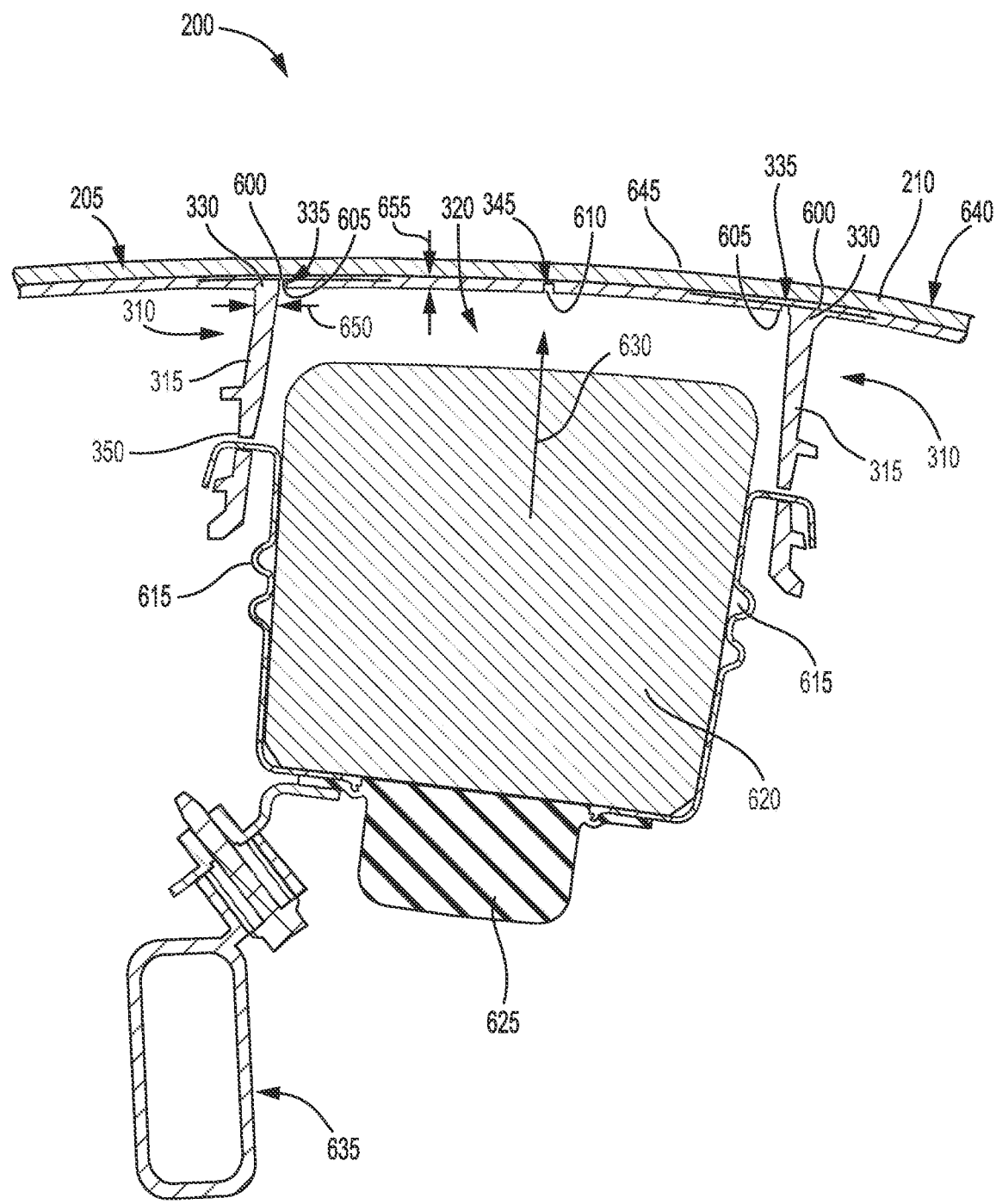
FIG. 6 depicts an example cross-sectional view of a dashboard member, in accordance with some aspects.

As depicted in FIG. 6, among others, a cross-sectional view of the dashboard member 200 is shown. The dashboard member 200 can include the chute member 310 to support an airbag 620. For example, the dashboard member 200 can include the chute member 310 coupled with a support member 615. The support member 615 can support the airbag 620 with the airbag positioned at least partially within (e.g., extending into) the cavity 320 of the chute member 310. The airbag 620 can be contracted (e.g., not expanded, in a compact or folded state, in an undeployed state) with the airbag 620 supported by the support member 615 within the cavity 320 of the chute member 310. The airbag 620 can be inflatable. For example, the airbag 620 can rapidly (e.g., in less than a second, within 30 milliseconds, or within some other duration) inflate or expand upon deployment. The airbag 620 can inflate and expand into an interior of a vehicle (e.g., the electric vehicle 105 or another vehicle) upon impact of the vehicle with an object (e.g., another vehicle). The airbag 620 can be or include a nylon or fabric bag. The airbag 620 can inflate rapidly with nitrogen gas or some other gas.

The airbag 620 can include or be coupled with an actuator 625 to inflate airbag 620. The actuator 625 can facilitate the inflation or expansion of the airbag 620. For example, the actuator 625 can cause a chemical reaction to create a gas, where the gas can inflate the airbag 620. The chemical reaction can be a reaction of sodium azide ($NaN_3$) with potassium nitrate ($KNO_3$) to create nitrogen gas. The chemical reaction can be some other reaction to create nitrogen or some other gas. The actuator 625 can include an amount of compress gas that, when released, causes the airbag 620 to expand. The actuator 625 can be or include a sensor that initiates or prompts the inflation or expansion of the airbag 620. For example, the actuator 625 can include an accelerometer (e.g., crash or collision sensor) to detect an impact of the vehicle with another object, where a measurement beyond a certain threshold can cause the airbag 620 to inflate or expand. The airbag 620 can rapidly expand in the direction 630. For example, the airbag 620 can impact the surface 300 of the airbag cover 215 with the airbag 620 actuated by the actuator 625. For example, the airbag can rapidly expand in the direction 630 and can impact the inner surface 300 of the airbag cover 215 to cause the first portion 355 and the second portion 360 to separate at the tear seam 345. The impact of the airbag 620 against the surface 300 of the airbag cover 215 can cause the tear seam 345 and the breaking seam 340 to break. The impact of the airbag 620 against the surface 300 of the airbag cover 215 can cause the first portion 355 to bend (e.g., flex, rotate, pivot) at the first bending seam 335 and can cause the second portion 360 to bend at the second bending seam 335. For example, the airbag 620 can be expand or inflate through the panel member 205 and into an interior of a vehicle (e.g., the electric vehicle 105) with the tear seam 345 broken, and the first portion 355 and the second portion 360 pivoted at the first and second bending scams 335.

The chute member 310 can include at least one mounting device 350. For example, the chute member 310 can include the mounting device 350 to couple the chute member 310 (or the dashboard member 200) with another object, such as the support member 615. The mounting device 350 can be an aperture or opening to receive a portion (e.g., a protrusion, an extension, an arm, a fastener) of the support member 615 to couple the support member 615 with the chute member 310. For example, the mounting device 350 can be an aperture to receive an end or a portion of an end of the support member 615 such that the support member 615 will remain coupled with or will be retained by the chute member 310 such that the support member 615 will not separate from the chute member 310 upon application of a force on the support member 615 (e.g., during deployment of the airbag 620 or otherwise). The mounting device 350 can be a fastener, an adhesive, a mechanical joint, or some other mounting device to join the support member 615 with the chute member 310. For example, the mounting device 350 can couple the support member 615 with the chute member 310 with the support member 615 supporting the airbag 620 and with the chute member 310 to direct the airbag 620 in a deployed state through the airbag cover 215.

The support member 615, the actuator 625, or some other component can be directly or indirectly coupled with a structural member 635. The structural member 635 can be a structural member of the vehicle 105, for example. The structural member 635 can support the airbag 620, the actuator 625, the support member 615, or some other component with the airbag deploying (e.g., rapidly expanding in the direction 630). For example, actuation of the airbag 620 can impart large forces against the actuator 625, the support member 615, and the chute member 310 that is coupled with the support member 615. The structural member 635 can receive, withstand, absorb an impact force created with the airbag 620 deploys such the support member 615, the actuator 625, or the chute member 310 need not withstand the entire force imparted by the deployment of the airbag 620. The structural member 635 can be a frame element of the vehicle 105 or some component coupled thereto.

As depicted in FIG. 6, among others, the dashboard member 200 can include the panel member 205 having a weakening portion 610 integrally molded with the panel member 205 to create the tear seam 345. For example, the tear seam 345 can be formed by the weakening portion 610 integrally molded with the panel member 205. The weakening portion 610 can be integrally molded with the airbag cover 215 of the panel member 205. For example, the weakening portion 610 can extend from one end of the airbag cover 215 to another end (e.g., an opposing end) of the airbag cover 215 within the cavity 320. The weakening portion 610 can be at integrally molded with the first portion 355 and the second portion 360 of the airbag cover 215. For example, the weakening portion 610 can be integrally molded to form the tear seam 345 separating (e.g., bounding) the first portion 355 and the second portion 360 of the airbag cover 215. The weakening portion 610 can be molded during the same molding operation as the molding operation to mold the panel member 205, which can further be the same molding operation to mold the chute member 310 and to join the chute member 310 with the panel member 205 to create the unitary dashboard member 200. The weakening portion 610 can be or include a groove, notch, indent, impression, trench, or other cavity formed within the panel member 205. The weakening portion 605 can be or include at least one perforation structures. For example, the weakening portion 610 can include depressions, cavities, indents, or perforations to form a region having a relatively thin wall section. The weakening portion 610 can include perforations having a dashed, X-shaped, serpentine, slashed or hatched shape, alternating shapes (e.g., a short dash shape alternating with a long dash shape), a patterned shape, or some other shape. The weakening portion 610 can extend along an entire length of a portion or member of the dashboard member 200 (e.g., along an entire length of the first portion 355 or the second portion 360). The weakening portion 610 can include partial perforations, complete perforations (through holes), or perforations having a varying depth. For example, the weakening portion 610 can be a portion of the panel member 205 having a reduced wall thickness such that the panel member 205 will break at the tear seam 345 when subject to a force beyond some threshold magnitude. For example, the weakening portion 610 forming the tear seam 345 can purposefully create a weak seam (e.g., line, path, or edge) of the airbag cover 215 such that the airbag cover 215 (e.g., the first portion 355 and the second portion 360) will break (e.g., separate, shear, fracture, open) from the each other at the tear seam 345 when the airbag cover 215 is subject to some force, such as an impact force imparted by the airbag 620 as the airbag 620 expands or inflates.

The dashboard member 200 can include a weakening portion integrally molded with the panel member 205 to create the breaking seam 340. For example, the breaking seam 340 can be formed by a weakening portion integrally molded with the panel member 205. The breaking seam 340, although not shown in FIG. 6, can be perpendicular or substantially perpendicular (e.g., ±30° from perpendicular) to the tear seam 345 or the bending seam 335 shown in FIG. 6, among others. The weakening portion forming the breaking seam 340 can be integrally molded with the airbag cover 215 of the panel member 205. For example, the weakening portion forming the breaking seam 340 can extend along an edge of the joint 330 joining the chute member 310 with the panel member 205 and within the cavity 320. The weakening portion forming the breaking seam 340 can be at integrally molded with the first portion 355 and the second portion 360 of the airbag cover 215. The weakening portion to form the breaking seam 340 can be molded during the same molding operation as the molding operation to mold the panel member 205, which can further be the same molding operation to mold the chute member 310 and to join the chute member 310 with the panel member 205 to create the unitary dashboard member 200. The weakening portion to create the breaking seam 340 can be or include a groove, notch, indent, impression, trench, or other cavity formed within the panel member 205. The weakening portion can be or include at least one perforation structures. For example, the weakening portion can include depressions, cavities, indents, or perforations to form a region having a relatively thin wall section. The weakening portion can include perforations having a dashed, X-shaped, serpentine, slashed or hatched shape, alternating shapes (e.g., a short dash shape alternating with a long dash shape), a patterned shape, or some other shape. The weakening portion can extend along an entire length of a portion or member of the dashboard member 200 (e.g., along an entire length of the first portion 355 or the second portion 360). The weakening portion can include partial perforations, complete perforations (through holes), or perforations having a varying depth. For example, the weakening portion forming the bending seam 335 can be a portion of the panel member 205 having a reduced wall thickness such that the panel member 205 will break at the breaking seam 340 when subject to a force beyond some threshold magnitude. For example, the weakening portion forming the breaking seam 340 can purposefully create a weak seam (e.g., line, path, or edge) of the airbag cover 215 such that the airbag cover 215 (e.g., the first portion 355 and the second portion 360) will break (e.g., separate, shear, fracture, open) from the panel member 205 at the breaking seam 340 when the airbag cover 215 is subject to some force, such as an impact force imparted by the airbag 620 as the airbag 620 expands or inflates.

The dashboard member can include the panel member 205 having a weakening portion 605 integrally molded with the panel member 205 to create the bending seam 335. For example, the weakening portion 605 can be a second weakening portion 605. The weakening portion 605 can be integrally molded with the airbag cover 215 of the panel member 205. For example, the weakening portion 605 can extend along one edge of the airbag cover 215 within the cavity 320. The weakening portion 605 can extend along a straight path, a curved path, or some other path. The weakening portion 605 can be at integrally molded with the first portion 355 or the second portion 360 of the airbag cover 215. For example, a first weakening portion 605 can be integrally molded with the first portion 355 of the airbag cover 215 to form the first bending seam 335. A second weakening portion 605 can be integrally molded with the second portion 360 to form the second bending seam 335. The weakening portion 605 can be molded during the same molding operation as the molding operation to mold the panel member 205, which can further be the same molding operation to mold the chute member 310 and to join the chute member 310 with the panel member 205 to create the unitary dashboard member 200. The weakening portion 605 can be or include a groove, notch, indent, impression, trench, or other cavity formed within the panel member 205. The weakening portion 605 can be or include at least one perforation structures. For example, the weakening portion 605 can include depressions, cavities, indents, or perforations to form a region having a relatively thin wall section. The weakening portion 605 can include perforations having a dashed, X-shaped, serpentine, slashed or hatched shape, alternating shapes (e.g., a short dash shape alternating with a long dash shape), a patterned shape, or some other shape. The weakening portion 605 can extend along an entire length of a portion or member of the dashboard member 200 (e.g., along an entire length of the first portion 355 or the second portion 360). The weakening portion 605 can include partial perforations, complete perforations (through holes), or perforations having a varying depth. For example, the weakening portion 605 can be a portion of the panel member 205 having a reduced wall thickness such that the first portion 355 or the second portion 360 can bend, flex, crease, at the bending seam 335 when subject to a force beyond some threshold magnitude. For example, the weakening portion 605 forming the bending seam 335 can purposefully create a weak seam (e.g., line, path, or edge) of the airbag cover 215 such that the airbag cover 215 (e.g., the first portion 355 and the second portion 360) will bend (e.g., flex, crease, rotate, pivot, fold) along the bending seam 335 when the airbag cover 215 is subject to some force, such as an impact force imparted by the airbag 620 as the airbag 620 expands or inflates. The airbag cover 215 or portion thereof can bend along the bending seam 335 rather than bending along another line, path, or seam of the airbag cover 215 with the weakening portion 605 integrally molded with the panel member 205.

The dashboard member 200 can include at least one hinge member 600 integrally molded with the panel member 205. For example, the dashboard member 200 can include the hinge coupled with the airbag cover 215. The hinge member 600 can be a flexible member molded within the panel member 205 to prevent a portion of the panel member 205 from separating from a remainder of the panel member 205 with the tear seam 345 broken. The hinge member 600 can include an elastic material having a high tensile strength or some other material that can retain a portion of the panel member 205 (e.g., the airbag cover 215) to a remainder of the panel member 205 with the tear seam 345 broken or with the airbag 620 deployed through the airbag cover 215. For example, the first portion 355 and the second portion 360 of the airbag cover 215 can pivot at the bending seam 335 with the tear seam 345, the breaking seams 340 broken, and the airbag 620 extending through airbag cover 215. A force imparted by the airbag 620 on the airbag cover 215 can be a significant force that can undesirably stress the bending seam 335 or undesirably cause the bending seam 335 to break, fracture, separate, or tear. The dashboard member 200 can include the hinge member 600 integrally molded with the airbag cover 215 to prevent the airbag cover 215 from breaking, fracturing, or tearing at the bending seam 335. For example, the hinge member 600 can be integrally molded with the panel member 205 and can extend from one side of the joint 330 (e.g., a side within the cavity 320) to another side of the joint 330 (e.g., a side outside of the cavity 320). The hinge member 600 can extend across bending seam 335 or can be integrally formed with the panel member 205 in a region having the bending seam 335 formed therein. For example, as depicted in FIG. 6, among others, the hinge member 600 and the bending seam 335 can be overlapping or stacked. The hinge member 600 can be integrally molded with a region of the panel member 205 and the weakening portion 605 can be integrally molded with the panel member 205 in the same region.

The dashboard member 200 can include a first hinge member 600 integrally molded with the panel member 205 to bend at the first bending seam 335 and a second hinge member 600 integrally molded with the panel member 205 to bend at the second bending seam 335. For example, the first hinge member 600 can bend at the first bending seam 335 to couple the first portion 355 of the airbag cover 215 with the panel member 205. The second hinge member 600 can be integrally coupled with the panel member 205 at the second bending seam 335 to bend at the second bending seam 335. The second hinge member 600 can prevent the second portion 360 of the airbag cover 215 from separating (e.g., detaching or decoupling) from the panel member 205.

The hinge member 600 can be or include a porous membrane that can become at least partially impregnated with polymeric material. For example, the hinge member 600 can include multiple openings, passageways, voids, or pores that can filled (e.g., impregnated, occupied) by another material, such as a molten polymeric material during a molding operation. The hinge member 600 can be a mesh hinge, for example. The panel member 205 and the chute member 310 can be molded polymeric components. As discussed in detail below with reference to FIGS. 11 and 13, among others, the panel member 205 and the chute member 310 can be injection molded. The panel member 205 or the chute member 310 can be compression molded or molded via some other molding operation. For example, the panel member 205 and the chute member 310 can be molded by providing molten (e.g., melted, viscous, moldable) polymeric material into cavity of a mold. The hinge member 600 can be positioned within the mold prior to and during an operation to mold the panel member 205 and the chute member 310 such that the panel member surface 210 of the panel member 205 is molded with the hinge member 600 within the cavity of the mold. The hinge member 600 can be an over-mold hinge. For example, the panel member 205 can be molded over the hinge member 600 such that the molten polymeric material used to form the panel member 205 and the chute member 310 can be provided into the pores, openings, voids, or spaces of the hinge member 600. Molding the panel member 205 against with the hinge member 600 present within the mold cavity can cause the molten polymeric material to impregnate, saturate, or otherwise occupy the pores, voids, openings, or spaces of the hinge member 600. For example, rather than applying an adhesive to the surface 300 and subsequently applying the hinge member 600 onto the adhesive to couple the hinge with the panel member 205, the hinge member 600 can be over-molded with the panel member 205 to couple the hinge member 600 with the panel member 205. The hinge member 600 can be integrally molded with the hinge member 600 such that the hinge member 600 is at least partially suspended within the polymeric material of the panel member 205. The hinge member 600 be over-molded (e.g., integrally molded) with the panel member 205 during the single molding operation used to create the panel member 205 and the chute member 310, for example.

The dashboard member 200 can include a topcoat 640 on a surface of the panel member 205. For example, the topcoat 640 can be a layer, sheet, or ply of material on the surface 210 of the dashboard member 200. The topcoat 640 can cover the panel member 205 or be wrapped (e.g., draped, placed over, envelope) the panel member 205. The topcoat 640 can be coupled with the surface 210. For example, the topcoat 640 can be adhered to the surface 210 with glue or some other adhesive, fastened to the surface 210 with at least one fastener (e.g., a rivet or some other fastener), sewn to the surface 210, or otherwise coupled with the surface 210. The topcoat 640 can be an outermost layer of the dashboard member 200 and can define an outer surface 645 of the dashboard member 200. For example, the topcoat 640 can be visible from an interior of the vehicle (e.g., the electric vehicle 105) within which the dashboard member 200 can be installed. The topcoat 640 can be or include an organic material, an inorganic material, a synthetic material, some other material, or some combination thereof. For example, the topcoat 640 can be or include a leather material, a synthetic leather material, or some other material. The topcoat 640 can be or include a porous or semi-porous material. The topcoat 640 can be or include a solid or dense material. The topcoat 640 can be or include a flexible, pliable, or malleable material. For example, the topcoat 640 can be stretched or form-fitted over the surface 210 to match a curvature or profile of the panel member 205.

The dashboard member 200 can include the topcoat 640 at least partially impregnated with a polymeric material. For example, the topcoat 640 can be at least partially impregnated with a polymeric material of the panel member 205 to adhere the topcoat 640 with the surface of the panel member 205. The panel member 205 and the chute member 310 can be molded polymeric components. For example, and as discussed in detail below with reference to FIGS. 11 and 13, among others, the panel member 205 and the chute member 310 can be injection molded. The panel member 205 or the chute member 310 can be compression molded or molded via some other molding operation. For example, the panel member 205 and the chute member 310 can be molded by providing molten (e.g., melted, viscous, moldable) polymeric material into cavity of a mold. The topcoat 640 can be positioned within the mold prior to and during an operation to mold the panel member 205 and the chute member 310 such that the panel member surface 210 of the panel member 205 is molded against the topcoat 640. For example, the panel member 205 can be molded behind the topcoat 640 such that the molten polymeric material used to form the panel member 205 is provided against an inner surface of the topcoat 640. Molding the panel member 205 against the inner surface of the topcoat 640 can cause the molten polymeric material to adhere to, partially impregnate, or otherwise couple with the inner surface of the topcoat 640. For example, rather than applying an adhesive to the surface 210 and subsequently applying the topcoat 640 onto the adhesive to couple the topcoat 640 with the panel member 205, the panel member 205 can be molded with the topcoat 640 to apply the topcoat 640 on the panel member 205. The topcoat 640 can be applied on the panel member 205 during the single molding operation used to create the panel member 205 and the chute member 310, for example.

The dashboard member 200 can include the topcoat 640 to retain the airbag cover 215 with a remainder of the dashboard member 200. For example, the airbag cover 215 can include the first portion 355 and the second portion 360 to bend (e.g., pivot, flex, rotate) about the first bending seam 335 and the second bending seam 335. The topcoat can be coupled with the first portion 355 and the second portion 360 and can act as a hinge to retain the first portion 355 and the second portion 360 to a remainder of the dashboard member 200 with the tear seam 345 broken. For example, a force imparted by the airbag 620 on the surface 300 of the airbag cover 215 can cause the tear seam 345, the breaking seams 340, and corresponding areas of the topcoat 640 (e.g., portions of the topcoat 640 applied over the tear seam 345 and the breaking seams 340) to separate such that the airbag 620 can inflate or expand out of the airbag cover 215. A portion of the topcoat 640 positioned over the bending seam 335 can withstand the force imparted by the airbag 620 and remain intact (e.g., not broken) with the topcoat 640 coupled with the first portion 355 and the second portion 360. For example, the first portion 355 and the second portion 360 can pivot about respective bending seams 335 with the topcoat 640 coupled thereto while a portion of the topcoat 640 applied over the bending seam 335 can remain intact. The first portion 355 and the second portion 360 can remain coupled with the dashboard member 200 via the topcoat 640 with the tear seam 345 broken and the airbag 620 expanding through the airbag cover 215.

The topcoat 640 can be applied to the dashboard member 200 after the dashboard member 200 has been molded. For example, rather than molding the dashboard member 200 with the topcoat 640 within a cavity of the mold, the topcoat 640 can be separately applied to the surface 210 of the dashboard member 200. For example, the topcoat 640 can be applied directly to the surface 210 of the dashboard member 200 or with some other material positioned therebetween. The dashboard member 200 can include one or more pockets, depressions, or curved surfaces to receive a foam member. For example, the foam member can be coupled with the surface 210 and the topcoat 640 can be applied atop the foam member.

Figure 7:
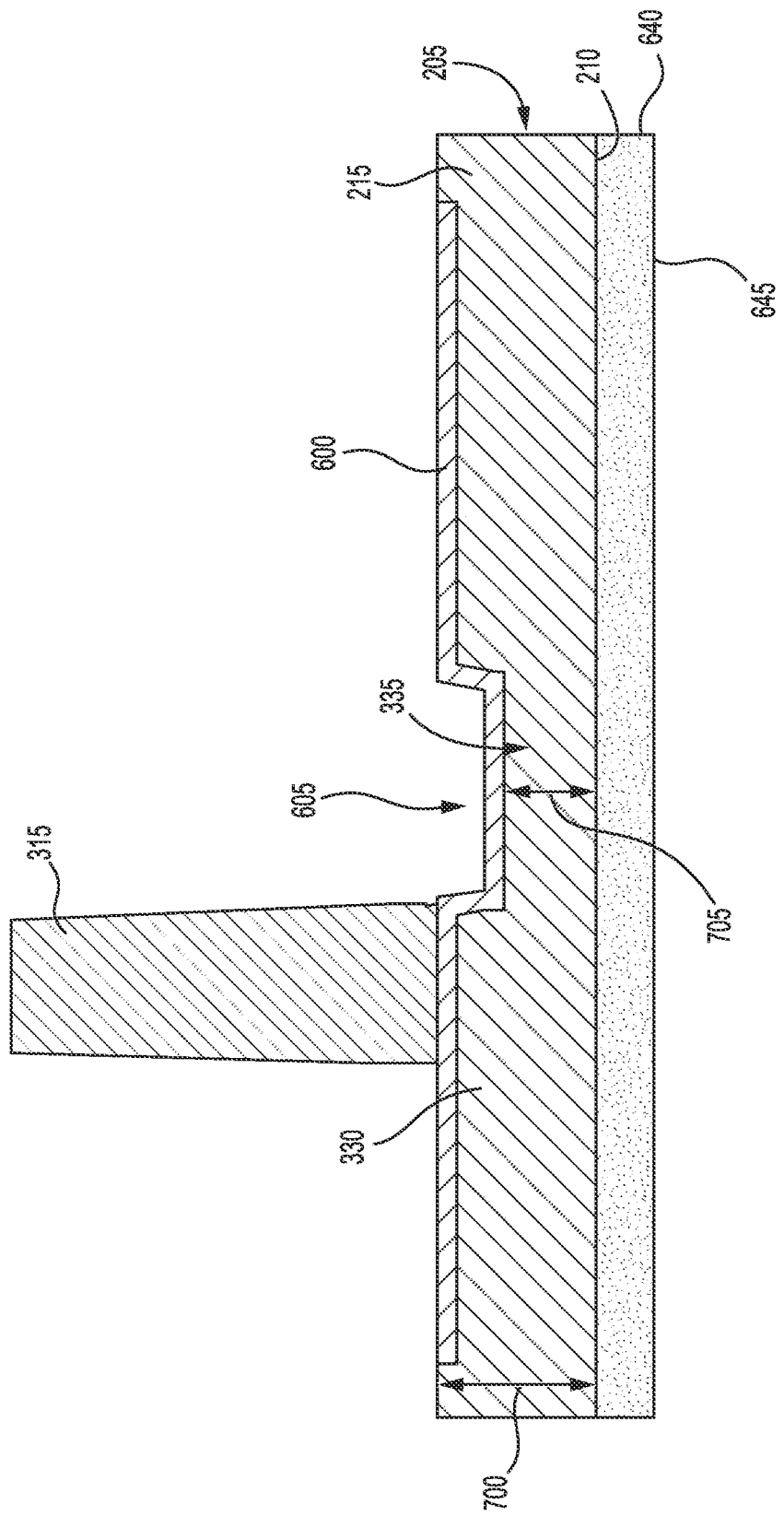
FIG. 7 depicts an example cross-sectional view of a bending seam of a dashboard member, in accordance with some aspects.
Figure 8:
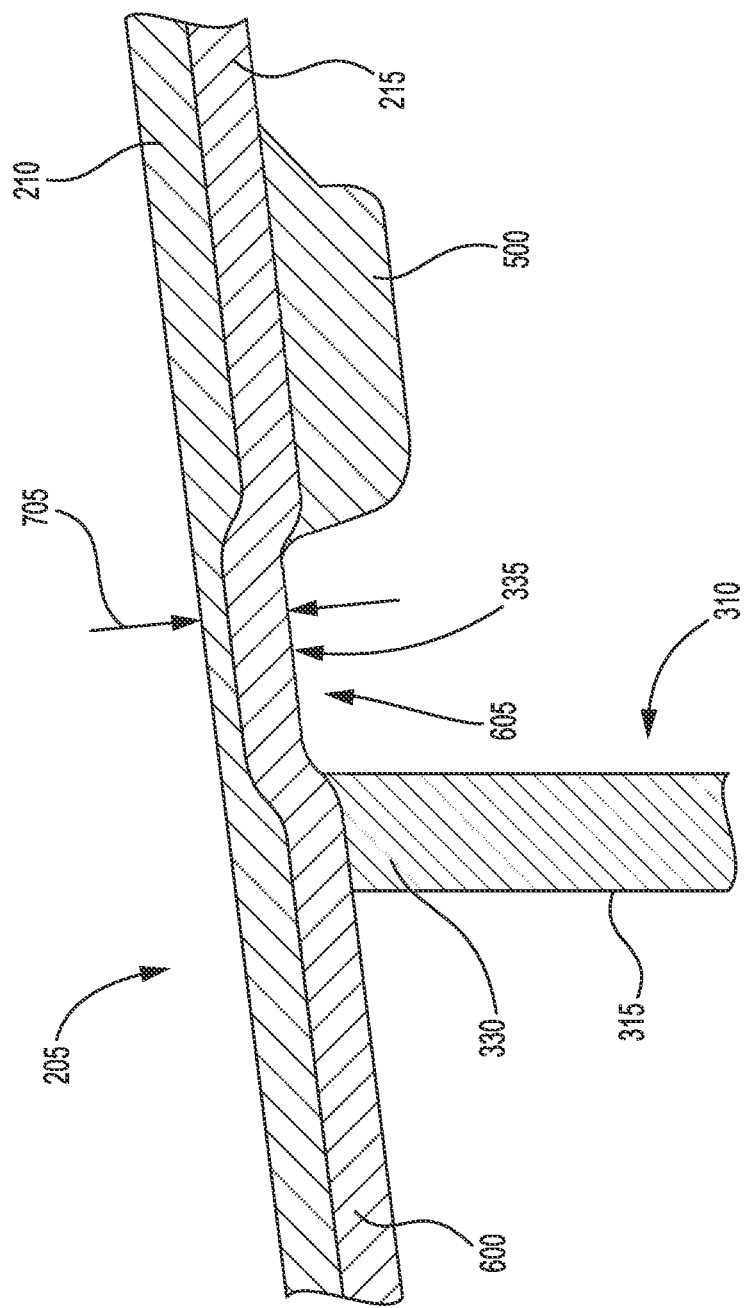
FIG. 8 depicts an example cross-sectional view of a bending seam of a dashboard member, in accordance with some aspects.

Referring now to FIGS. 7 and 8, among others, a cross-sectional view of the bending seam 335 is shown in detail. The dashboard member 200 can include the weakening portion 605 integrally molded with the panel member 205 to form the bending seam 335. For example, the weakening portion 605 can be an indent, depression, groove, or notch molded into the panel member 205. The bending seam 335 can therefore take an indented, depressed, grooved, or notched shape. For example, the bending seam 335 can have a U-shaped cross-sectional form factor with the weakening portion 605 integrally molded with the panel member 205. The bending seam 335 can include some other cross-sectional form factor. The hinge member 600 can be integrally molded with the panel member 205 at the bending seam 335. For example, the hinge member 600 and the bending seam 335 can be molded on top of or adjacent to each other such that the hinge member 600 can bend or flex with a corresponding bending or flexing of the airbag cover 215. The panel member 205 can include a first wall thickness 700 and a second wall thickness 705 at the bending seam 335. For example, the weakening portion 605 can be integrally molded with the airbag cover 215 of the panel member 205 to create the bending seam 335, where the bending seam 335 can include the wall thickness 705. The panel member 205 or the airbag cover 215 can include the wall thickness 700 in regions apart from the bending seam 335 (e.g., regions between the bending seam 335 and the tear seam 345 or regions outside of the cavity 320). The wall thickness 705 can be less than the wall thickness 700. For example, the panel member 205 or the airbag cover 215 can be weaker at the bending seam 335 such that the panel member 205 or the airbag cover 215 can bend or flex at the bending seam 335 when subject to some force (e.g., a force imparted by the airbag 620 during deployment) rather than along some other line or seam.

Figure 9:
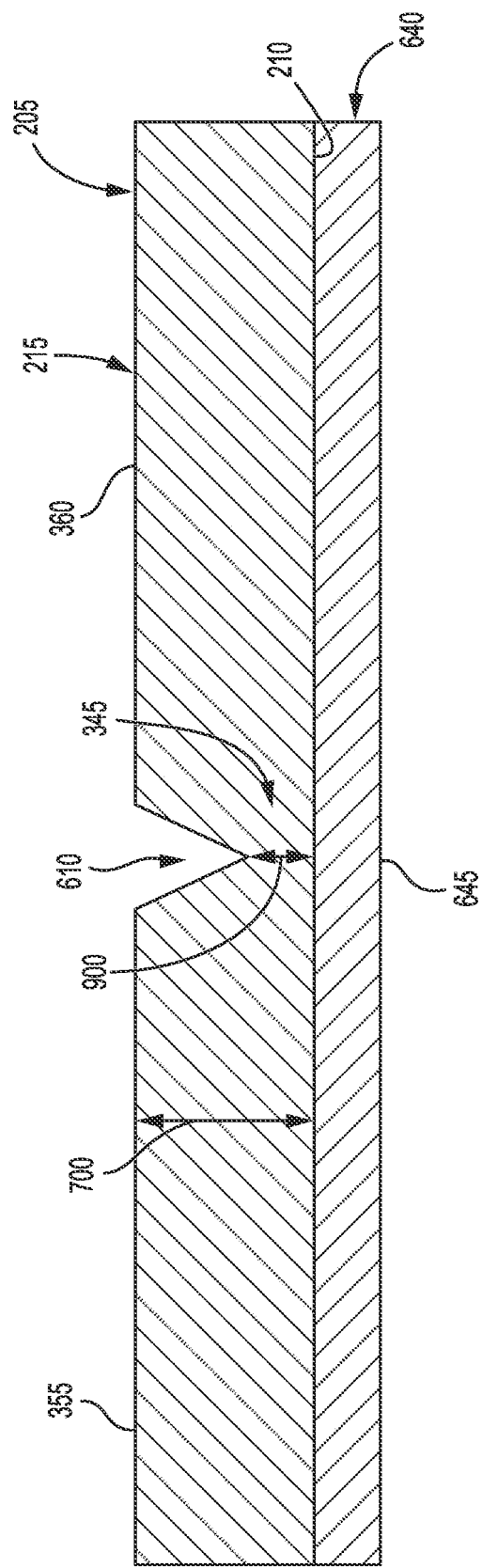
FIG. 9 depicts an example cross-sectional view of a tear seam of a dashboard member, in accordance with some aspects.
Figure 10:
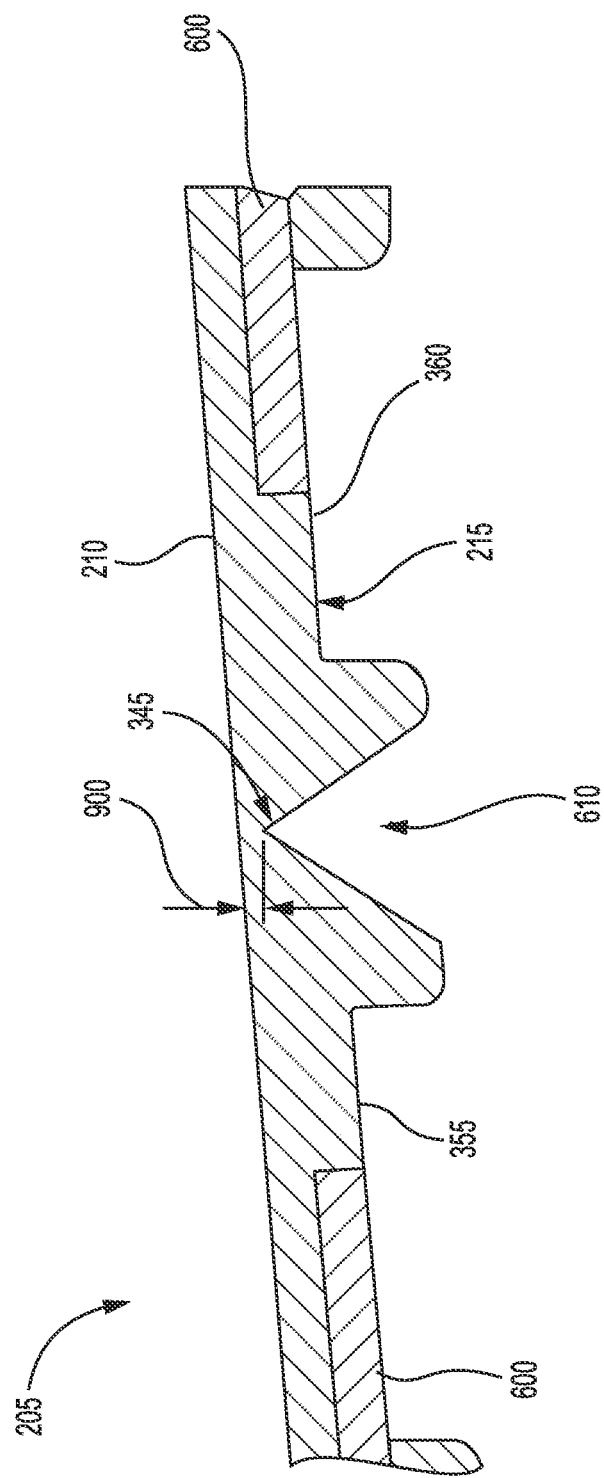
FIG. 10 depicts an example cross-sectional view of a tear seam of a dashboard member, in accordance with some aspects.

Referring now to FIGS. 9 and 10, among others, a cross-sectional view of the tear seam 345 is shown in detail. The dashboard member 200 can include the weakening portion 610 integrally molded with the panel member 205 to form the tear seam 345. For example, the weakening portion 610 can be an indent, depression, groove, or notch molded into the panel member 205. The tear seam 345 can therefore be take an indented, depressed, grooved, or notched shape. For example, the tear seam 345 can have a V-shaped cross-sectional form factor with the weakening portion 610 integrally molded with the panel member 205. The tear seam 345 can include some other cross-sectional form factor. As indicated above, the panel member 205 can include the wall thickness 700. The airbag cover 215 of the panel member 205 can include the wall thickness 900 at the tear seam 345. For example, the weakening portion 610 can be integrally molded with the airbag cover 215 of the panel member 205 to create the tear seam 345, where the tear seam 345 can include the wall thickness 900. The panel member 205 or the airbag cover 215 can include the wall thickness 700 in regions apart from the tear seam 345 (e.g., regions between the tear seam 345 and the bending seam 335 or regions outside of the cavity 320). The wall thickness 900 can be less than the wall thickness 700. For example, the panel member 205 or the airbag cover 215 can be weaker at the tear seam 345 such that the panel member 205 or the airbag cover 215 can break at the tear seam 345 when subject to some force (e.g., a force imparted by the airbag 620 during deployment) rather than along some other line or seam.

Figure 11:
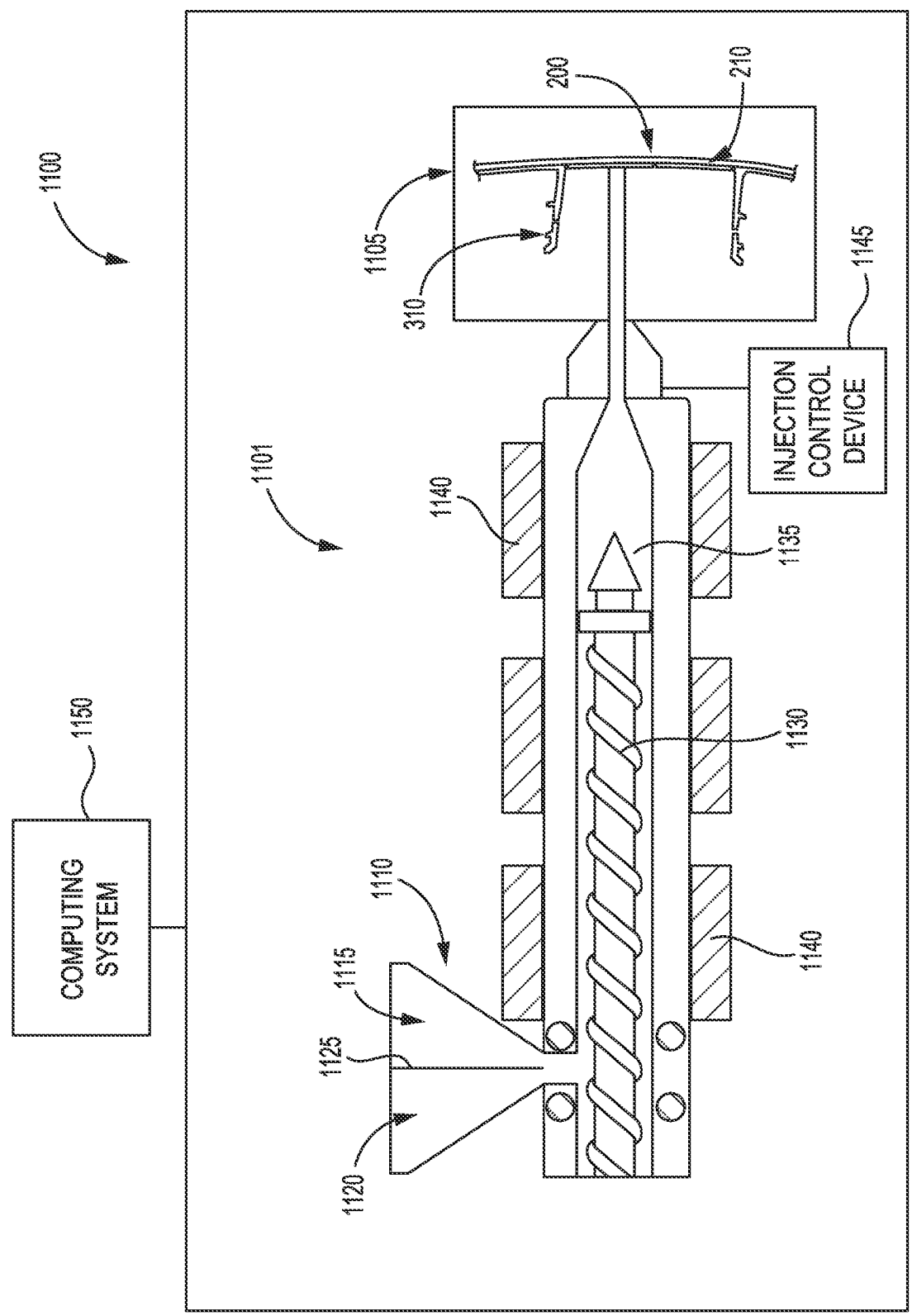
FIG. 11 depicts an example molding system for molding a dashboard member, in accordance with some aspects.

FIG. 11, among others, depicts a system 1100. The system 1100 can be a molding system 1100 to mold the dashboard member 200. For example, the system 1100 can include an injection molding system 1101 and a mold 1105. The injection molding system 1101 can inject melted (e.g., molten, hot, viscous, semi-viscous) polymeric material into the mold 1105. The mold 1105 can include a cavity that, when filled with the melted polymeric material, can form the dashboard member 200. For example, the mold can include the cavity to mold the dashboard member 200 from polymeric material with the dashboard member 200 including the panel member 205 integrally molded with the chute member 310. Although FIG. 11 depicts an injection molding system, it is understood that other molding processes can be used to mold the dashboard member 200 having the panel member 205 integrally molded with the chute member 310.

The injection molding system 1101 can include at least one input device 1110 to receive material. For example, the input device 1110 can receive at least one material that can be melted and injected into the mold 1105 to form the dashboard member 200. The input device 1110 can receive a solid material, a liquid material, a semi-liquid material, or some other material to create the melted polymeric material. For example, the input device 1110 can include a first input device 1115 to receive a first material and a second input device 1120 to receive a second material. The first input device 1115 and the second input device 1120 can be distinct and separate input devices. The first input device 1115 and the second input device 1120 can be integrated into one input device. For example, and as depicted in FIG. 11, among others, the input device 1110 can be a hopper having a first hopper 1115 and a second hopper 1120 separated by a partition 1125. The first input device 1115 can receive a solid material, such as pellets or powder including a polymeric material. The second input device 1120 can receive a powder, liquid, or some other chemical agent. For example, the second input device 1120 can receive a chemical foaming agent. Although FIG. 11 depicts the second input device 1120 positioned near the first input device 1115, it is understood that the second input device 1120 can be positioned elsewhere. For example, the second input device 1120 can be positioned between the mold 1105 and the first input device 1115. The second input device can be positioned to provide a chemical foaming agent into the mold 1105 as the material received in the first input device 1115 is provided to the mold 1105.

The injection molding system 1101 can include an extruder screw 1130 and a cavity 1135. The input device 1110 (e.g., the first input device 1115 or the second input device 1120) can provide material into the cavity 1135. The extruder screw 1130 can extend into the cavity 1135 and can rotate within the cavity 1135 to melt the material received via the input device 1110. The injection molding system 1101 can include at least one heating element 1140. The heating element 1140 can generate heat and emanate heat towards the cavity 1135. For example, multiple heating elements 1140 can be positioned around the cavity 1135 to heat the cavity 1135 and the material within the cavity 1135 that can be received via the input device 1110. The extruder screw 1130 can rotate within the cavity 1135 to extrude or melt the material from the input device 1110. For example, the extruder screw 1130 can rotate to move the material within the cavity 1135 from the input device 1110 to the mold 1105. The material can be melted or otherwise prepared for injection into the mold 1105 with the extruder screw 1130 conveying the material towards the mold 1105 within the cavity 1135.

The molding system 1100 can include or be communicably coupled with a computing system 1150. The computing system 1150 can control, monitor, or otherwise influence an operation of the injection molding system 1101. For example, the computing system 1150 can transmit information (e.g., a command) to the injection molding system 1101 to or some component of the injection molding system 1101 to control an operation thereof. The computing system 1150 can receive information from the injection molding system 1101 or some component thereof. For example, the computing system 1150 can transmit information to or receive information from an injection control device 1145 of the injection molding system 1101. The injection control device 1145 can control an injection pressure or an injection velocity of the injection molding system 1101. For example, the injection control device 1145 can increase, decrease, or maintain a pressure at which the melted material is injected into the mold 1105. The injection control device 1145 can increase, decrease, or maintain a velocity at which the melted material is injected into the mold 1105. The computing system 1150 can cause the injection control device 1145 to maintain a constant injection pressure as the material is injected into the mold 1105. For example, the injection control device 1145 can increase or decrease an injection velocity as necessary in order to maintain a constant injection pressure as commanded by the computing system 1150. The constant pressure can be a constant low pressure. The constant low pressure maintained by the injection control device can cause the promote an even cooling of the melted material after it has been injected into the mold 1105, which can reduce defects and improve quality of components. For example, thin sections of the dashboard member 200, such as the weakening portion 605 or the weakening portion 610 can be molded with the molding system 1100.

Figure 12:
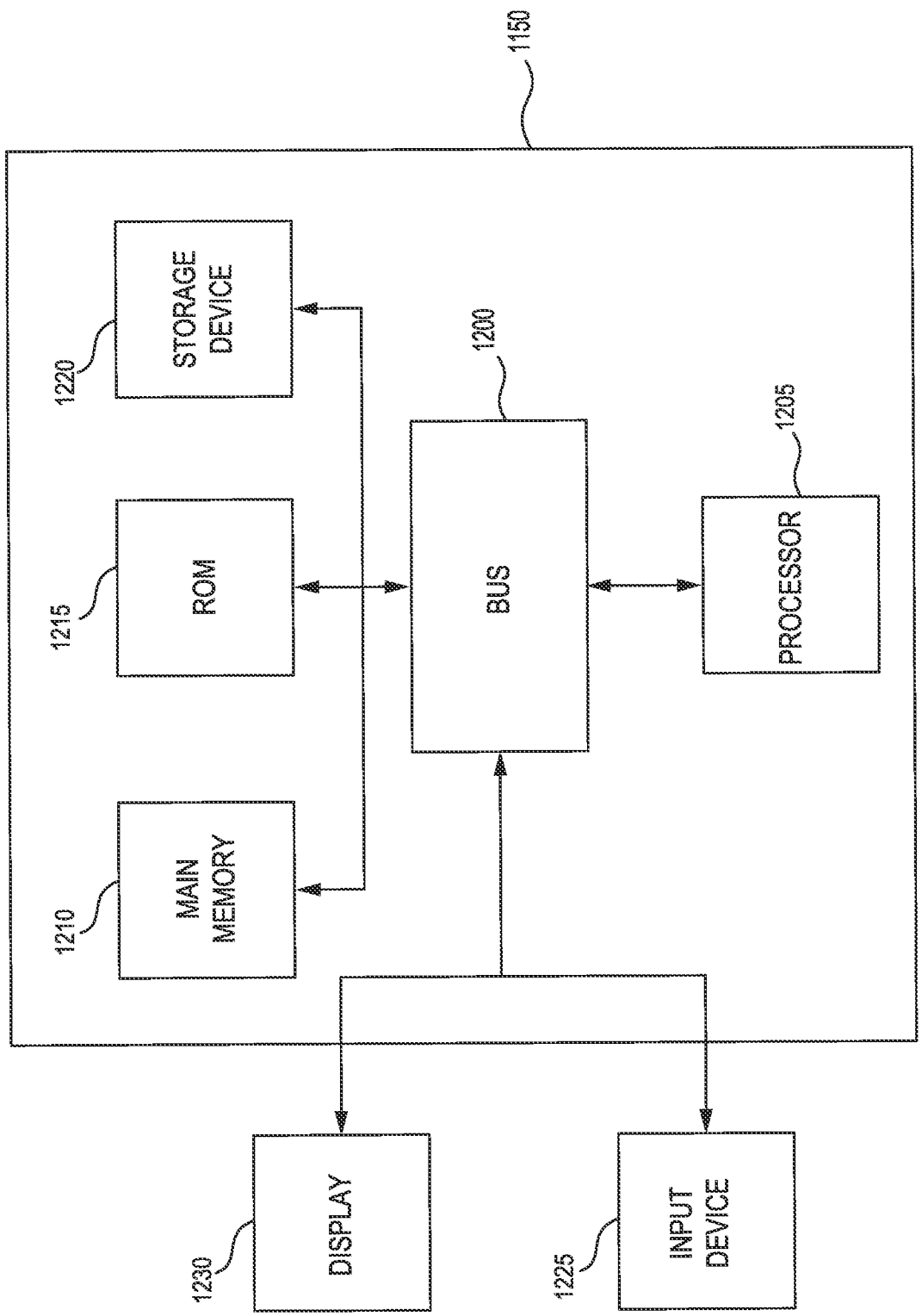
FIG. 12 is a block diagram illustrating an architecture for a computer system that can be employed to implement elements of the systems and methods described and illustrated herein.

FIG. 12 depicts an example block diagram of an example computer system 1150. The computer system or computing device 1150 can include or be used to implement a data processing system or its components. The computing system 1150 includes at least one bus 1200 or other communication component for communicating information and at least one processor 1205 or processing circuit coupled to the bus 1200 for processing information. The computing system 1150 can also include one or more processors 1205 or processing circuits coupled to the bus for processing information. The computing system 1150 also includes at least one main memory 1210, such as a random access memory (RAM) or other dynamic storage device, coupled to the bus 1200 for storing information, and instructions to be executed by the processor 1205. The main memory 1210 can be used for storing information during execution of instructions by the processor 1205. The computing system 1150 may further include at least one read only memory (ROM) 1215 or other static storage device coupled to the bus 1200 for storing static information and instructions for the processor 1205. A storage device 1220, such as a solid state device, magnetic disk or optical disk, can be coupled to the bus 1200 to persistently store information and instructions.

The computing system 1150 may be coupled via the bus 1200 to a display 1230, such as a liquid crystal display, or active matrix display, for displaying information to a user such as a driver of the electric vehicle 105 or other end user. An input device 1225, such as a keyboard or voice interface may be coupled to the bus 1200 for communicating information and commands to the processor 1205. The input device 1225 can include a touch screen display 1230. The input device 1225 can also include a cursor control, such as a mouse, a trackball, or cursor direction keys, for communicating direction information and command selections to the processor 1205 and for controlling cursor movement on the display 1230.

The processes, systems and methods described herein can be implemented by the computing system 1150 in response to the processor 1205 executing an arrangement of instructions contained in main memory 1210. Such instructions can be read into main memory 1210 from another computer-readable medium, such as the storage device 1220. Execution of the arrangement of instructions contained in main memory 1210 causes the computing system 1150 to perform the illustrative processes described herein. One or more processors in a multi-processing arrangement may also be employed to execute the instructions contained in main memory 1210. Hard-wired circuitry can be used in place of or in combination with software instructions together with the systems and methods described herein. Systems and methods described herein are not limited to any specific combination of hardware circuitry and software.

Figure 13:
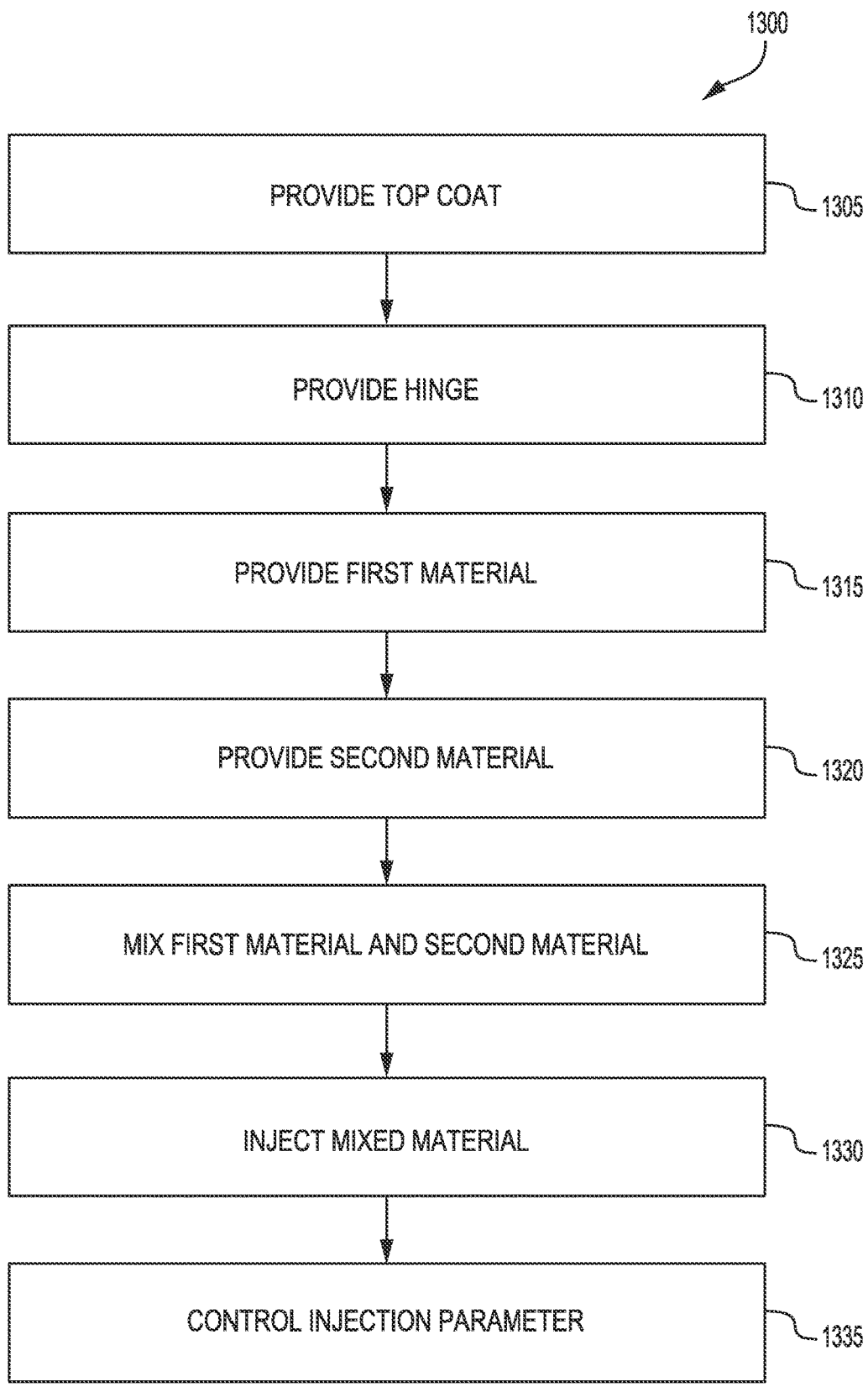
FIG. 13 is a flow chart of an example method of molding a dashboard member, in accordance with some aspects.

FIG. 13, among others, depicts a method 1300. The method 1300 can be a method of molding the dashboard member 200. The method 1300 can include one or more of ACTS 1305-1340. Each of ACTS 1305-1340 can be omitted or can be performed in some order other than that shown in FIG. 13.

The method 1300 can include providing at least one topcoat at ACT 1305. For example, the method 1300 can include providing the topcoat 640 at ACT 1305. The topcoat 640 can be provided within the cavity of the mold 1105 of the molding system 1100. For example, the topcoat 640 can be a layer, sheet, or ply of a material behind which the panel member 205 and the chute member 310 can be molded. The topcoat 640 can be positioned within the mold 1105 in a position such that the surface 210 of the dashboard member 200 can be formed on or against an inner surface of the topcoat 640. The injection molding system 1101 can inject melted polymeric material or a chemical foaming agent into the mold 1105, and the injected materials can contact the inner surface of the topcoat 640 to form the panel member 205 integrally molded with the chute member 310 with the surface 210 of the dashboard member 200 against the topcoat 640. The topcoat 640 can be at least partially impregnated with the injected material with the panel member 205 molded behind the topcoat 640.

The method 1300 can include providing at least one hinge at ACT 1310. For example, the method 1300 can include providing at least one hinge member 600 at ACT 1310. The hinge member 600 can be provided within the cavity of the mold 1105 of the molding system 1100. For example, the hinge member 600 can be positioned within the cavity of the mold 1105 such that the hinge member 600 will be positioned proximate (e.g., over, under, stacked with) a bending scam 335 or a joint 330 of the dashboard member 200 with the dashboard member 200 molded within the mold 1105. The hinge member 600 can be a porous material that can receive (e.g., be at least partially impregnated by) material injected into the mold 1105 via the injection molding system 1101. For example, the hinge member 600 can be overmolded by the polymeric material injected into the mold 1105 with the hinge member 600 positioned within the mold 1105.

The method 1300 can include providing a first material at ACT 1315. For example, the method 1300 can include providing a polymeric material to the input device 1110 of the injection molding system 1101 at ACT 1315. The first material can be provided to a first input device 1115 (e.g., a hopper, conveyor, or some other device) such that the first material can be provided into the cavity 1135 of the injection molding system 1101. The first material can be a solid material (e.g., pellets, a powder, or some other form of material) that can be conveyed within the cavity 1135 from the input device 1110 to the mold 1105 to be injected into the mold 1105. For example, the first material can be conveyed from the input device 1110 to the mold 1105 within the cavity 1135 via the screw 1130.

The method 1300 can include providing a second material at ACT 1320. For example, the method 1300 can include providing a chemical foaming agent to the input device 1110 of the injection molding system 1101. The chemical foaming agent can be provided to the second input device 1120, which can further provide the chemical foaming agent to the injection molding system 1101. The second input device 1120 can be positioned to provide the chemical foaming agent to the same location of the injection molding system 1101 or a different location (e.g., between an input location for the first material and the mold 1105). For example, the chemical foaming agent can be an organic or inorganic chemical compound that can undergo a chemical reaction or chemical decomposition with the first material (e.g., a polymeric material) and the chemical foaming agent provided (e.g., injected) into the mold 1105 of the system 1100. The chemical foaming agent can undergo a gas evolution reaction with the chemical foaming agent within the mold to create a gas. The chemical foaming agent can undergo an endothermic reaction or an exothermic reaction. The chemical foaming agent can produce (e.g., release) carbon dioxide, nitrogen, or some other gas during a chemical reaction within the mold 1105.

The method 1300 can include mixing the first material and the second material at ACT 1325. For example, the method 1300 can include mixing the first material and the second material within the cavity 1135 of the injection molding system 1101 at ACT 1325. The first material can be provided to the cavity of the injection molding system 1101 at ACT 1315. The first material can be melted within the cavity 1135 by the heating element or by the extruder screw 1130 as the screw 1130 conveys the first material towards the mold 1105. The second material can be provided to the injection molding system 1101 at the same location or at a different location. For example, the second material can be a chemical foaming agent that can be provided to the cavity 1135 at the same location as the first material or at a different location, such as a downstream location after the first material has been melted within the cavity 1135. The first material and the second material can be commingled, mixed, blended, or combined prior to or as the material provided to the mold 1105. For example, the first material and the second material can be provided to the cavity 1135 and mixed as the extruder screw 1130 rotates. The second material can be provided to the cavity 1135 after the first material has been conveyed towards the mold 1105 and the second material can mix with the first material as the first material and second material are injected into the mold 1105.

The method 1300 can include injecting the mixed material at ACT 1330. For example, the method 1300 can include injecting the first material and the second material mixed at ACT 1325 into the mold 1105 of the molding system 1100. The mixed material can be provided into a cavity of the mold with the material in a molten or semi-molten state. For example, the mixed material can be a viscous material that a can flow into the mold under pressure. The mixed material can be injected into the mold 1105 to fill the mold with the mixed material. For example, a predetermined amount of material can be injected into the mold 1105 such that the cavity of the mold 1105 can be filled with the mixed material. The mixed material can, for example, be molded behind the topcoat 640 provided to the mold at ACT 1305 or over the hinge member 600 provided at ACT 1310. The injected material can form the dashboard member 200, including the panel member 205 integrally molded with the chute member 310.

The method 1300 can include controlling an injection parameter at ACT 1335. For example, the method 1300 can include controlling a pressure or a velocity of the mixed material injected into the mold 1105 at ACT 1335. The injection molding system 1101 can include the computing system 1150 and the injection control device 1145 to control, monitor, or otherwise influence one or more parameters associated with injection of the mixed material into the mold. For example, the injection control device 1145 can increase, decrease, or maintain a pressure or velocity at which the mixed material is injected into the mold 1105. The computing system 1150 and the injection control device 1145 can constantly or continuously (e.g., at regular intervals) control the pressure or velocity at which the mixed material is injected into the mold 1105. For example, the computing system 1150 and the injection control device 1145 can control a velocity at which the mixed material is injected into the mold 1105 in order to maintain a constant pressure (e.g., a low pressure). The computing system 1150 and the injection control device 1145 can control the velocity or the pressure in order to prevent defects associated with molding thin parts. For example, the computing system 1150 and the injection control device 1145 can maintain a constant, low injection pressure by varying a velocity at which the mixed material is injected into the mold such that the weakening portion 605 or the weakening portion 610 can be integrally molded with the panel member 205 of the dashboard member.

Figure 14:
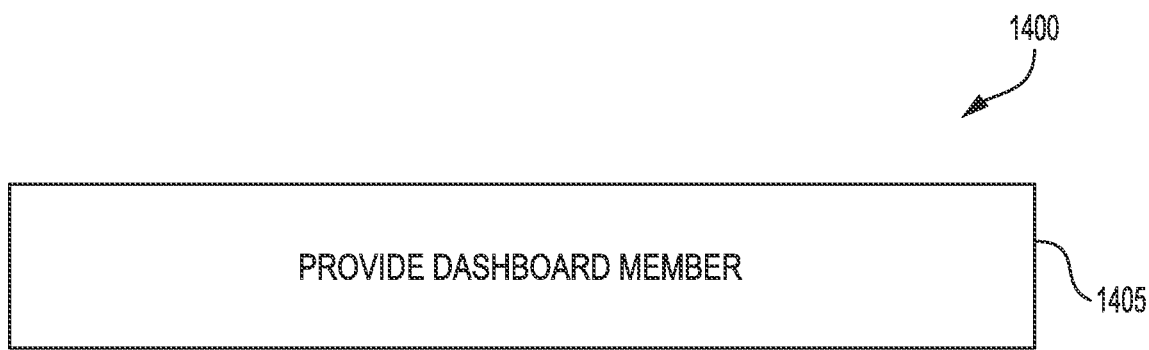
FIG. 14 is a flow chart of an example method of providing a dashboard member, in accordance with some aspects.

FIG. 14, among others, depicts a method 1400. The method 1400 can be a method of providing an apparatus at ACT 1405. The apparatus can be the dashboard member 200. For example, the method 1200 can include providing the dashboard member 200 at ACT 1405. The dashboard member 200 can include a panel member 205 coupled with a chute member 310. For example, the panel member 205 can be integrally molded (e.g., simultaneously molded, molded during a single molding operation) with the chute member 310. The dashboard member 200 can include the chute member 310 integrally molded with the panel member 205 at a joint 330. The joint 330 can include a porous polymeric material. The dashboard member 200 can include the chute member 310 can include the wall 315 to define the cavity 320 and to support the airbag 620 within the cavity 320 such that the airbag 620 can be deployed through the airbag cover 215 of the panel member 205. The dashboard member 200 can include the weakening portion 610 integrally molded with the panel member 205 or with the airbag cover 215 of the panel member 205 to form a tear seam 345. The dashboard member 200 can include the weakening portion 605 integrally molded with the panel member 205 or the airbag cover 215 to form a bending seam 335. The airbag cover 215 can include a first portion 355 and a second portion 360. The first portion can pivot about a first bending seam 335 and the second portion 360 can pivot about a second bending seam 335 with the tear seam 345. The dashboard member 200 can include the hinge member 600 integrally molded with the panel member 205 to bend at the first bending seam 335 or the second bending seam 335.

Figure 15:
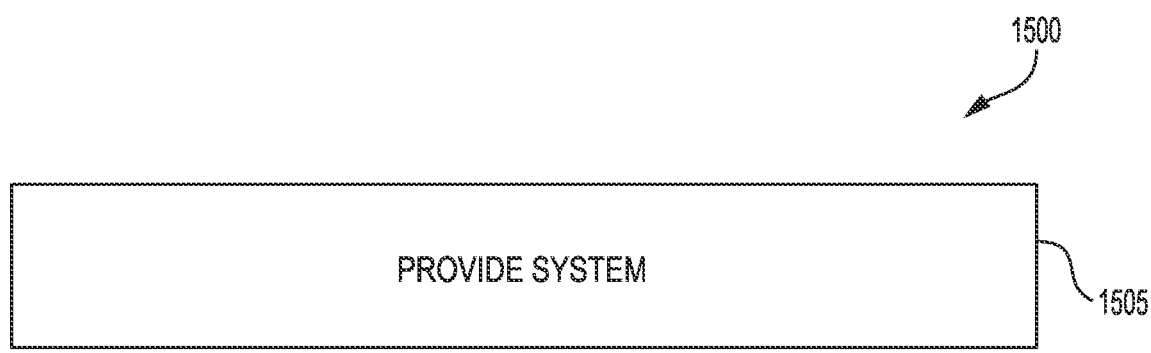
FIG. 15 is a flow chart of an example method of providing a system for molding a dashboard member, in accordance with some aspects.

FIG. 15, among others, depicts a method 1500. The method 1500 can include providing a system at ACT 1505. The system can be the injection molding system 1100. For example, the method 1500 can include providing the injection molding system 1100 at ACT 1505. The injection molding system 1100 can include a mold 1105 to mold the dashboard member 200 having the panel member 205 integrally molded (e.g., simultaneously molded, molded during a single molding operation) with the chute member 310. The injection molding system 1100 can include the input device 1110 to receive a first material in the first input device 1115 and to receive a second material in the second input device 1120. For example, the first input device 1115 and the second input device 1120 can be separated by a partition 1125. The first material can be a polymeric material or some other material. The second material can be a chemical foaming agent or some other material. For example, the first material and the second material can be mixed (e.g., combined, blended) within the cavity 1135 of the injection molding system 1101 and injected into the mold 1105. The screw 1130 or the heating element 1140 of the injection molding system 1100 can mix, melt, blend, or otherwise combine the first material and the second material within the cavity 1135. For example, the first material and the second material can mix and be injected into the mold 1105, where the second material can be a chemical foaming agent that can create or undergo a reaction within the mold to produce a gas. The gas created by the first material can form gas bubbles within the mixed material to cause the mixed material to expand. For example, the second material can create a porous polymeric structure within the chute member 310 or the panel member 205 at the joint 330 or some other location. The second material can reduce or prevent sink defects that can be caused at joints (e.g., the joint 330), namely joints combining a thick wall (e.g., the wall 315 of the chute member 310) with a thin wall (e.g., the panel member 205). The system 1100 can include or be communicably coupled with an injection control device 1145 and a computing system 1150. For example, the injection control device 1145 can control one or more operations of the system 1100. The injection control device 1145 can be an electronic controller or some other control device that can be monitored, controlled, or otherwise influenced by the computing system 1150. The injection control device 1145 can control a pressure, temperature, velocity, or other parameter of the mixed material. For example, the injection control device 1145 can maintain a constant pressure of the mixed material as the mixed material is injected into the mold to facilitate molding of thin-walled parts, such as the seams 335, 340, or 345 of the dashboard member 200.

Although an example computing system 1150 has been described in FIG. 11, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer-based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:
a panel member including a weakening portion integrally molded with the panel member to create a tear seam;
a chute member integrally molded with the panel member, the chute member to support an air bag and direct the air bag through the tear seam; and
the chute member having a first wall thickness that is greater than a second wall thickness of the panel member.

2. The apparatus of claim 1, comprising:
the chute member integrally molded with the panel member at a joint, the joint including a porous polymeric material.

3. The apparatus of claim 1, comprising:
the chute member integrally molded with the panel member at a joint, the joint including a porous polymeric material, the porous polymeric material comprising a chemical foaming agent.

4. The apparatus of claim 1, comprising:
the panel member having a first surface and a second surface opposite the first surface; and
a topcoat on the second surface of the panel member.

5. The apparatus of claim 1, comprising:
the chute member including a first wall having the first wall thickness and a second wall, the first wall integrally molded with the panel member at a first joint, the second wall integrally molded with the panel member at a second joint;
a second weakening portion integrally molded with the panel member proximate the first wall to form a first bending seam; and
a third weakening portion integrally molded with the panel member proximate the second wall to form a second bending seam.

6. The apparatus of claim 1, comprising:
a topcoat on a surface of the panel member, the topcoat at least partially impregnated into a polymeric material of the panel member to adhere the topcoat to the panel member.

7. The apparatus of claim 1, comprising:
the panel member including a second weakening portion integrally molded with the panel member to form a bending seam, the panel member to bend at the bending seam with the tear seam broken.

8. The apparatus of claim 1, comprising:
a hinge member integrally molded with the panel member;
the panel member including a second weakening portion integrally molded with the panel member to form a bending seam, the hinge member to bend at the bending seam with the tear seam broken.

9. The apparatus of claim 1, comprising:
a hinge member integrally molded with the panel member;
the panel member including a second weakening portion integrally molded with the panel member to form a bending seam;
a first portion and a second portion of the panel member, the first portion to bend at the bending seam relative to the second portion with the tear seam broken; and
the hinge member integrally molded with the first portion and the second portion of the panel member to couple the first portion with the second portion with the tear seam broken.

10. The apparatus of claim 1, comprising:
the chute member including a first wall having the first wall thickness and a second wall, the first wall integrally molded with the panel member at a first joint, the second wall integrally molded with the panel member at a second joint;
the panel member including a second weakening portion integrally molded with the panel member to form a first bending seam at the first joint and a third weakening portion integrally molded with the panel member to form a second bending seam at the second joint;
a first hinge member integrally molded with the panel member proximate the first bending seam; and
a second hinge member integrally molded with the panel member proximate the second bending seam.

11. The apparatus of claim 1, comprising:
the panel member including a second weakening portion integrally molded with the panel member to form a bending seam;
a first portion and a second portion of the panel member, the first portion to bend relative to the second portion at the bending seam; and
a topcoat on the panel member, the topcoat to retain the first portion with the panel member and to retain the second portion with the panel member with the tear seam broken.

12. A method, comprising:
integrally molding, by a molding system during a single molding operation, a panel member with a chute member at a joint, the panel member including a weakening portion integrally molded with the panel member to form a tear seam, the chute member to support an airbag and direct the airbag through the tear seam, the joint including a porous polymeric material; and
the chute member having a first wall thickness that is greater than a second wall thickness of the panel member.

13. The method of claim 12, wherein integrally molding the weakening portion comprises injecting a polymeric material into a mold at a constant pressure.

14. The method of claim 12, comprising:
providing a first material and a second material to the molding system, the first material or the second material to react within a mold of the molding system to create the porous polymeric material.

15. The method of claim 12, comprising:
providing a hinge member into a mold of the molding system, wherein the panel member is integrally molded with the chute member over the hinge member; and integrally molding, by the molding system, a second weakening portion and with the panel member to form a bending seam, the hinge member permitting a first portion of the panel member to bend at the bending seam.

16. The method of claim 12, comprising:
providing a topcoat into a mold of the molding system, wherein a first surface of the panel member is integrally molded with the chute member and a second surface of the panel member is molded against the topcoat.

17. A vehicle, comprising:
a dashboard member within an interior of the vehicle, the dashboard member comprising:
- a panel member including a weakening portion integrally molded with the panel member to create a tear seam;
- a chute member integrally molded with the panel member at a joint, the chute member to support an air bag and direct the air bag through the tear seam, the joint including a porous polymeric material; and
- the chute member having a first wall thickness that is greater than a second wall thickness of the panel member.

* * * * *